United States Patent
Sridharan et al.

(10) Patent No.: US 12,294,991 B2
(45) Date of Patent: May 6, 2025

(54) CAPABILITY SIGNALING FOR UPLINK DEMODULATION REFERENCE SIGNAL BUNDLING

(71) Applicant: QUALCOMM Incorporated, San Diego, CA (US)

(72) Inventors: Gokul Sridharan, Sunnyvale, CA (US); Hung Dinh Ly, San Diego, CA (US); Seyedkianoush Hosseini, San Diego, CA (US); Mahmoud Taherzadeh Boroujeni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 383 days.

(21) Appl. No.: 17/739,016

(22) Filed: May 6, 2022

(65) Prior Publication Data

US 2022/0361203 A1 Nov. 10, 2022

Related U.S. Application Data

(60) Provisional application No. 63/186,561, filed on May 10, 2021.

(51) Int. Cl.
*H04L 5/00* (2006.01)
*H04L 1/00* (2006.01)
(Continued)

(52) U.S. Cl.
CPC ....... *H04W 72/1268* (2013.01); *H04L 5/0051* (2013.01); *H04W 72/0446* (2013.01); *H04W 72/23* (2023.01); *H04W 72/51* (2023.01)

(58) Field of Classification Search
CPC ......... H04W 72/1268; H04W 72/0446; H04W 72/23; H04W 72/51; H04L 5/0051; H04L 1/89
See application file for complete search history.

(56) References Cited

U.S. PATENT DOCUMENTS 10,172,163 B2  1/2019 Lin et al.
2019/0313419 A1* 10/2019 Fakoorian ......... H04W 28/0278
(Continued)

FOREIGN PATENT DOCUMENTS

CA        2560677 A1    10/2005
WO     WO-03058829 A2    7/2003
(Continued)

OTHER PUBLICATIONS

3GPP TSG-RAN WG1#87, R1-1612046 Title:DL open loop MIMO Transmissin schemes (Year: 2016).*
3GPP TSG-RAN WG1 Meeting #110, R1-2205955 Title:Correction of UE behaviour of restarting DMRS bundling (Year: 2022).*
3GPP TSG-RAN WG1 Meeting#105-e, R1-2105655 Title:PUCCH Dynamic Repetition and DMRS Bundling (Year: 2021).*
(Continued)

*Primary Examiner* — Faruk Hamza
*Assistant Examiner* — Abusayeed M Haque
(74) *Attorney, Agent, or Firm* — Holland & Hart / QUALCOMM Incorporated

(57) ABSTRACT

Methods, systems, and devices for wireless communications are described. Generally, a UE may transmit, to a network entity, a first control message reporting a bundled transmission capability of the UE to transmit multiple bundled uplink transmissions for maintaining phase continuity for a plurality of physical uplink channels, receive, from the network entity, control signaling scheduling the plurality of physical uplink channels in accordance with the bundled transmission capability; and transmit, based at least in part on the control signaling, the plurality of physical uplink channels having phase continuity.

30 Claims, 20 Drawing Sheets

(51) Int. Cl.
  *H04W 72/0446* (2023.01)
  *H04W 72/1268* (2023.01)
  *H04W 72/23* (2023.01)
  *H04W 72/51* (2023.01)

(56) References Cited

U.S. PATENT DOCUMENTS

| | | | | |
|---|---|---|---|---|
| 2019/0313436 | A1* | 10/2019 | Lee | H04L 5/0094 |
| 2020/0213057 | A1* | 7/2020 | Bala | H04L 5/0053 |
| 2020/0358557 | A1* | 11/2020 | Park | H03M 13/618 |
| 2021/0014095 | A1* | 1/2021 | Ly | H04W 72/23 |
| 2021/0051596 | A1* | 2/2021 | Lee | H04W 52/48 |
| 2024/0163135 | A1* | 5/2024 | Liu | H04L 25/0228 |

FOREIGN PATENT DOCUMENTS

| | | | |
|---|---|---|---|
| WO | WO-2005099197 | A1 | 10/2005 |
| WO | WO-2021167518 | A1 * | 8/2021 |
| WO | WO-2022152195 | A1 | 7/2022 |

OTHER PUBLICATIONS

3GPP TSG-RAN WG1 Meeting#105-e, R1-2105906 Title:Implecations of DMRS bundling for PUSCH and PUCCH (Year: 2021).*
Huawei., et al., "WF on Phase Continuity and Power Consistency for PUCCH and PUSCH Repetition", 3GPP TSG-RAN WG4 #98bis-e, R4-21XXXX, Electronic Meeting, Apr. 12-20, 2021, 8 Pages.
Zeng J., et al., "A Novel OFDMA Ranging Method Exploiting Multiuser Diversity", IEEE Transactions on Communications, vol. 58, No. 3, Mar. 2010, pp. 945-955.
International Search Report and Written Opinion—PCT/US2022/028387—ISA/EPO—Oct. 17, 2022.
VIVO: "Discussion on PUCCH Enhancements", 3GPP TSG RAN WG1 #104-e, R1-2100460, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 18, 2021, XP051970382, 6 Pages, Sections 3.1-3.2.

* cited by examiner

CAPABILITY SIGNALING FOR UPLINK DEMODULATION REFERENCE SIGNAL BUNDLING

CROSS REFERENCE

The present application for patent claims the benefit of U.S. Provisional Patent Application No. 63/186,561 by SRIDHARAN et al., entitled "CAPABILITY SIGNALING FOR UPLINK DEMODULATION REFERENCE SIGNAL BUNDLING," filed May 10, 2021, assigned to the assignee hereof, and expressly incorporated by reference herein.

FIELD OF TECHNOLOGY

The following relates to wireless communications, including capability signaling for uplink demodulation reference signal bundling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), and/or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses as well as to computer-readable media and computer programs that support capability signaling transmissions. The present application provides a solution as defined in the independent claims. Optional variants are defined in the dependent claims.

Generally, a UE may report its demodulation reference signal (DMRS) bundling capability for maintaining phase continuity over multiple uplink channels (e.g., multiple uplink transmissions on physical uplink channels) when an intervening time gap occurs between consecutive uplink transmissions. For example, the consecutive uplink transmissions may include a first transmission and a second transmission adjacent or sequential in time (e.g., transmissions in adjacent slots) with a time gap (e.g., a time gap of a symbol within the slot including the first transmission) between the first transmission and the second transmission, among other examples. In some examples, the first transmission may be located in a first slot, and the second transmission may be located (e.g., subsequent to an intervening second slot) in a third slot. The transmissions may be sequential, and therefore referred to as consecutive transmissions) but may be separated by a time gap (e.g., the intervening second slot). In some examples, the first transmission and the second transmission may be located in adjacent slots (e.g., and may be referred to as consecutive, adjacent, or sequential). However, the first transmission may not occupy the entire slot, and a remainder of the first adjacent slot, such that the time gap occurring between the consecutive uplink transmissions may include one or more symbols of the consecutive slots (e.g., a remainder of the first slot not occupied by the first transmission may be a gap between the first transmission in the first slot and the second transmission in the second slot). The UE may transmit a control message including capability information, and the network entity may configure uplink transmissions accordingly so that the UE may maintain uplink phase continuity over the intervening time gap. In some examples, the UE may indicate that it is capable of maintaining phase continuity across multiple uplink channels even if there is an intervening time gap between at least one pair of consecutive uplink transmissions.

The capability information may include indications of whether the UE can maintain phase continuity across a set of uplink transmissions in a same slot or across multiple slots. The capability information may also indicate whether the UE can maintain phase continuity over the set of uplink channels if uplink or downlink signaling is scheduled within the intervening time gap between at least one consecutive pair of bundled uplink channels (e.g., a pair of bundled uplink channels consecutive in time), if the UE can maintain phase continuity over the set of bundled uplink channels when switching between transmit chains or component carriers (CCs) for transmissions of one or more uplink channels, if the UE can maintain phase continuity over the set of bundled uplink channels that are transmitted across different carriers, or the like. The capability information may be indicated on a per band basis, a per subcarrier spacing basis, a per modulation and coding scheme (MCS) basis, or the like. In some examples, the UE may indicate a maximum duration for the time gap, or a maximum amount of the time gap during which uplink or downlink singling may be scheduled, a minimum time between the end of an intervening uplink or downlink signal and a next uplink transmission, or any combination thereof.

A method for wireless communications at a user equipment (UE) is described. The method may include transmitting, to a network entity, a first control message reporting a bundled transmission capability of the UE to maintain phase continuity for a set of multiple physical uplink channels (e.g., multiple uplink transmissions on one or more physical uplink channels), receiving, from the network entity based on the first control message, control signaling scheduling the set of multiple physical uplink channels in accordance with the reported capability, and transmitting, based on the control signaling, the set of multiple physical uplink channels having phase continuity and a set of multiple demodulation reference signals corresponding to the set of multiple physical uplink channels.

An apparatus for wireless communications at a UE is described. The apparatus may include a processor, memory coupled with the processor, and instructions stored in the memory. The instructions may be executable by the processor to cause the apparatus to transmit, to a network entity, a first control message reporting a bundled transmission capability of the UE to maintain phase continuity for a set of multiple physical uplink channels, receive, from the network entity based on the first control message, control signaling scheduling the set of multiple physical uplink channels in accordance with the bundled transmission capability, and transmit, based on the control signaling, the set of multiple physical uplink channels having phase continuity and a set of multiple demodulation reference signals corresponding to the set of multiple physical uplink channels.

Another apparatus for wireless communications at a UE is described. The apparatus may include means for transmitting, to a network entity, a first control message reporting a bundled transmission capability of the UE to maintain phase continuity for a set of multiple physical uplink channels, means for receiving, from the network entity based on the first control message, control signaling scheduling the set of multiple physical uplink channels in accordance with the bundled transmission capability, and means for transmitting, based on the control signaling, the set of multiple physical uplink channels having phase continuity and a set of multiple demodulation reference signals corresponding to the set of multiple physical uplink channels.

A non-transitory computer-readable medium storing code for wireless communications at a UE is described. Likewise, a computer program comprising code for wireless communications at a UE is described. The code may include instructions executable by a processor to transmit, to a network entity, a first control message reporting a bundled transmission capability of the UE to maintain phase continuity for a set of multiple physical uplink channels, receive, from the network entity based on the first control message, control signaling scheduling the set of multiple physical uplink channels in accordance with the bundled transmission capability, and transmit, based on the control signaling, the set of multiple physical uplink channels having phase continuity and a set of multiple demodulation reference signals corresponding to the set of multiple physical uplink channels.

In some examples of the method, apparatuses, computer program and non-transitory computer-readable medium described herein, at least two consecutive physical uplink channels of the set of multiple physical uplink channels may be separated by a time period.

In some examples of the method, apparatuses, computer program and non-transitory computer-readable medium described herein, the time period is a time duration of less than a slot.

In some examples of the method, apparatuses, computer program and non-transitory computer-readable medium described herein, the time period is a time duration greater than or equal to a slot.

In some examples of the method, apparatuses, computer program and non-transitory computer-readable medium described herein, transmitting the first control message may include operations, features, means, or instructions for transmitting the first control message indicating that the UE may be capable of maintaining phase continuity for the set of multiple physical uplink channels that may be scheduled over a set of multiple time slots.

In some examples of the method, apparatuses, computer program and non-transitory computer-readable medium described herein, at least a portion of the set of multiple time slots may be consecutive in time within the set of multiple time slots.

In some examples of the method, apparatuses, computer program and non-transitory computer-readable medium described herein, transmitting the first control message may include operations, features, means, or instructions for transmitting the first control message indicating a frequency band, a modulation and coding scheme, or both, associated with the bundled transmission capability.

In some examples of the method, apparatuses, computer program and non-transitory computer-readable medium described herein, transmitting the first control message may include operations, features, means, or instructions for transmitting the first control message indicating whether the UE may be capable of maintaining phase continuity for the set of multiple physical uplink channels when at least one of the set of multiple physical uplink channels includes one or more intervening non-bundled transmissions.

In some examples of the method, apparatuses, computer program and non-transitory computer-readable medium described herein, transmitting the first control message may include operations, features, means, or instructions for receiving, from the network entity, a second control message indicating a change to a time slot format, where transmitting the first control message may be based on receiving the second control message.

In some examples of the method, apparatuses, computer program and non-transitory computer-readable medium described herein, transmitting the first control message may include operations, features, means, or instructions for transmitting the first control message indicating that the UE may be capable of maintaining phase continuity for the set of multiple physical uplink channels when scheduled within a same time slot.

In some examples of the method, apparatuses, computer program and non-transitory computer-readable medium described herein, transmitting the first control message may include operations, features, means, or instructions for transmitting the first control message indicating that the UE may be capable of maintaining phase continuity for the set of multiple physical uplink channels that may be scheduled over a set of multiple time slots.

In some examples of the method, apparatuses, computer program and non-transitory computer-readable medium described herein, at least a portion of the set of multiple time slots may be consecutive in time within the set of time slots.

In some examples of the method, apparatuses, computer program and non-transitory computer-readable medium described herein, transmitting the first control message may include operations, features, means, or instructions for transmitting the first control message indicating a frequency band, a sub-carrier spacing, a modulation and coding scheme, or any combination thereof, associated with the bundled transmission capability.

In some examples of the method, apparatuses, computer program and non-transitory computer-readable medium described herein, transmitting the first control message may include operations, features, means, or instructions for transmitting the first control message indicating a threshold number of time slots for the time period between the at least two consecutive physical uplink channels over which the UE is capable of maintaining phase continuity.

In some examples of the method, apparatuses, computer program and non-transitory computer-readable medium described herein, transmitting the first control message may include operations, features, means, or instructions for transmitting the first control message requesting that the network entity refrain from scheduling uplink transmission, or downlink transmission, or both, for the UE during the time period.

In some examples of the method, apparatuses, computer program and non-transitory computer-readable medium described herein, transmitting the first control message may include operations, features, means, or instructions for transmitting the first control message indicating that the UE supports scheduling of one or more downlink transmissions, one or more reference signal measurement durations, or any combination thereof, during the time period.

In some examples of the method, apparatuses, computer program and non-transitory computer-readable medium described herein, transmitting the first control message may include operations, features, means, or instructions for transmitting the first control message indicating that the UE supports scheduling of one or more uplink transmissions during the time period.

In some examples of the method, apparatuses, computer program and non-transitory computer-readable medium described herein, receiving the control signaling may include operations, features, means, or instructions for receiving the control signaling configuring a same set of parameter values for transmission of each of the set of multiple physical uplink channels and the one or more uplink transmissions.

In some examples of the method, apparatuses, computer program and non-transitory computer-readable medium described herein, the same set of parameters may include operations, features, means, or instructions for bandwidth, transmit power, modulation order, number of layers, antenna port, transmitted precoding matrix indicator, carrier, transmit chain switching configuration, or any combination thereof.

In some examples of the method, apparatuses, computer program and non-transitory computer-readable medium described herein, transmitting the first control message may include operations, features, means, or instructions for transmitting the first control message indicating that the UE supports scheduling of one or more intervening uplink transmissions during a first portion of the time period, a second portion of the time period that includes a transmission gap after an intervening scheduled transmission, or any combination thereof.

In some examples of the method, apparatuses, computer program and non-transitory computer-readable medium described herein, transmitting the first control message may include operations, features, means, or instructions for transmitting the first control message indicating a maximum duration for the time period between at least two consecutive physical uplink channels over which the UE is capable of maintaining phase continuity.

In some examples of the method, apparatuses, computer program and non-transitory computer-readable medium described herein, transmitting the first control message may include operations, features, means, or instructions for transmitting the first control message indicating that the UE supports transmission of the set of multiple physical uplink channels that may be all scheduled within a same frame.

In some examples of the method, apparatuses, computer program and non-transitory computer-readable medium described herein, transmitting the first control message may include operations, features, means, or instructions for transmitting the first control message indicating that the UE may be capable of maintaining phase continuity for a set of multiple physical uplink channels scheduled across a set of multiple carriers in carrier aggregation.

In some examples of the method, apparatuses, computer program and non-transitory computer-readable medium described herein, transmitting the first control message may include operations, features, means, or instructions for transmitting the first control message indicating that the UE may be capable of maintaining phase continuity for a set of multiple physical uplink channels scheduled across a first carrier of the set of multiple carriers during a first transmission window that may be aligned in time with a second transmission window of a second carrier of the set of multiple carriers.

In some examples of the method, apparatuses, computer program and non-transitory computer-readable medium described herein, transmitting the first control message may include operations, features, means, or instructions for transmitting the first control message indicating that the UE may be capable of maintaining phase continuity for a set of multiple physical uplink channels scheduled across a set of multiple transmit chains.

In some examples of the method, apparatuses, and computer program non-transitory computer-readable medium described herein, the set of multiple physical uplink channels may include operations, features, means, or instructions for a set of multiple physical uplink shared channels, a set of multiple physical uplink control channels, or both.

In some examples of the method, apparatuses, and computer program non-transitory computer-readable medium described herein, the set of multiple physical uplink channels may include operations, features, means, or instructions for a set of multiple repetitions of a same physical uplink channel, or two or more different physical uplink channels scheduled by a set of multiple downlink control information messages, or any combination thereof.

A method for wireless communications at a network entity is described. The method may include receiving, from a UE, a first control message reporting a bundled transmission capability of the UE to maintain phase continuity for a set of multiple physical uplink channels, transmitting, to the UE based on the first control message, control signaling scheduling the set of multiple physical uplink channels in accordance with the bundled transmission capability, and receiving, based on the control signaling, the set of multiple physical uplink channels having phase continuity and a set of multiple demodulation reference signals corresponding to the set of multiple physical uplink channels.

An apparatus for wireless communications at a network entity is described. The apparatus may include a processor, memory coupled with the processor, and instructions stored in the memory. The instructions may be executable by the processor to cause the apparatus to receive, from a UE, a first control message reporting a bundled transmission capability of the UE to maintain phase continuity for a set of multiple physical uplink channels, transmit, to the UE based on the first control message, control signaling scheduling the set of multiple physical uplink channels in accordance with the bundled transmission capability, and receive, based on the control signaling, the set of multiple physical uplink channels having phase continuity and a set of multiple demodulation reference signals corresponding to the set of multiple physical uplink channels.

Another apparatus for wireless communications at a network entity is described. The apparatus may include means for receiving, from a UE, a first control message reporting a bundled transmission capability of the UE to maintain phase continuity for a set of multiple physical uplink channels, means for transmitting, to the UE based on the first control message, control signaling scheduling the set of multiple physical uplink channels in accordance with the bundled transmission capability, and means for receiving, based on the control signaling, the set of multiple physical uplink channels having phase continuity and a set of multiple demodulation reference signals corresponding to the set of multiple physical uplink channels.

A non-transitory computer-readable medium storing code for wireless communications at a network entity is described. Likewise, a computer program comprising code for wireless communications at a network entity is described. The code may include instructions executable by a processor to receive, from a UE, a first control message reporting a bundled transmission capability of the UE to maintain phase continuity for a set of multiple physical uplink channels, transmit, to the UE based on the first control message, control signaling scheduling the set of multiple physical uplink channels in accordance with the bundled transmission capability, and receive, based on the control signaling, the set of multiple physical uplink channels having phase continuity and a set of multiple demodulation reference signals corresponding to the set of multiple physical uplink channels.

In some examples of the method, apparatuses, computer program and non-transitory computer-readable medium described herein, at least two consecutive physical uplink channels of the set of multiple physical uplink channels may be separated by a time period.

In some examples of the method, apparatuses, computer program and non-transitory computer-readable medium described herein, the time period is a time duration of less than a slot.

In some examples of the method, apparatuses, computer program and non-transitory computer-readable medium described herein, the time period is a time duration greater than or equal to a slot.

In some examples of the method, apparatuses, computer program and non-transitory computer-readable medium described herein, receiving the first control message may include operations, features, means, or instructions for transmitting, to the UE, a second control message indicating a change to a time slot format, where receiving the first control message may be based on transmitting the second control message.

In some examples of the method, apparatuses, computer program and non-transitory computer-readable medium described herein, receiving the first control message may include operations, features, means, or instructions for receiving the first control message indicating that the UE may be capable of maintaining phase continuity for the set of multiple physical uplink channels when scheduled within a same time slot.

In some examples of the method, apparatuses, computer program and non-transitory computer-readable medium described herein, receiving the first control message may include operations, features, means, or instructions for receiving the first control message indicating that the UE may be capable of maintaining phase continuity for the set of multiple physical uplink channels that may be scheduled over a set of multiple time slots.

In some examples of the method, apparatuses, computer program and non-transitory computer-readable medium described herein, at least a portion of the set of multiple time slots may be consecutive in time within the set of time slots.

In some examples of the method, apparatuses, computer program and non-transitory computer-readable medium described herein, receiving the first control message may include operations, features, means, or instructions for receiving the first control message indicating a frequency band, a sub-carrier spacing, a modulation and coding scheme, or any combination thereof, associated with the bundled transmission capability.

In some examples of the method, apparatuses, computer program and non-transitory computer-readable medium described herein, receiving the first control message may include operations, features, means, or instructions for receiving the first control message indicating a threshold number of time slots for the time period between the at least two consecutive physical uplink channels over which the UE is capable of maintaining phase continuity.

In some examples of the method, apparatuses, computer program and non-transitory computer-readable medium described herein, receiving the first control message may include operations, features, means, or instructions for receiving the first control message requesting that the network entity refrain from scheduling uplink transmission, or downlink transmission, or both, for the UE during the time period.

In some examples of the method, apparatuses, computer program and non-transitory computer-readable medium described herein, receiving the first control message may include operations, features, means, or instructions for receiving the first control message indicating that the UE supports scheduling of one or more downlink transmissions, one or more reference signal measurement durations, or any combination thereof, during the time period between the at least two consecutive physical uplink channels.

In some examples of the method, apparatuses, computer program and non-transitory computer-readable medium described herein, receiving the first control message may include operations, features, means, or instructions for receiving the first control message indicating that the UE supports scheduling of one or more uplink transmissions during the time period.

In some examples of the method, apparatuses, computer program and non-transitory computer-readable medium described herein, transmitting the control signaling may include operations, features, means, or instructions for transmitting the control signaling configuring a same set of parameter values for transmission of each of the set of multiple physical uplink channels and the one or more uplink transmissions.

In some examples of the method, apparatuses, computer program and non-transitory computer-readable medium described herein, bandwidth, transmit power, modulation order, number of layers, antenna port, TPMI, carrier, transmit chain switching configuration, or any combination thereof.

In some examples of the method, apparatuses, computer program and non-transitory computer-readable medium described herein, receiving the first control message may include operations, features, means, or instructions for receiving the first control message indicating that the UE supports scheduling of one or more intervening uplink transmissions during a first portion of the time period, a second portion of the time period that includes a transmission gap after an intervening scheduled transmission, or any combination thereof.

In some examples of the method, apparatuses, computer program and non-transitory computer-readable medium described herein, receiving the first control message may include operations, features, means, or instructions for receiving the first control message indicating a maximum duration for the time period between at least two consecutive physical uplink channels over which the UE is capable of maintaining phase continuity.

In some examples of the method, apparatuses, computer program and non-transitory computer-readable medium described herein, receiving the first control message may include operations, features, means, or instructions for receiving the first control message indicating that the UE supports transmission of the set of multiple physical uplink channels that may be all scheduled within a same frame.

In some examples of the method, apparatuses, computer program and non-transitory computer-readable medium described herein, receiving the first control message may include operations, features, means, or instructions for receiving the first control message indicating that the UE may be capable of maintaining phase continuity for a set of multiple physical uplink channels scheduled across a first carrier of the set of multiple carriers during a first transmission window that may be aligned in time with a second transmission window of a second carrier of the set of multiple carriers.

In some examples of the method, apparatuses, computer program and non-transitory computer-readable medium described herein, receiving the first control message may include operations, features, means, or instructions for receiving the first control message indicating whether the UE may be capable of maintaining phase continuity for the set of multiple physical uplink channels when at least one of the set of multiple physical uplink channels includes one or more intervening non-bundled transmissions.

In some examples of the method, apparatuses, computer program and non-transitory computer-readable medium described herein, receiving the first control message may include operations, features, means, or instructions for receiving the first control message indicating that the UE may be capable of maintaining phase continuity for a set of multiple physical uplink channels scheduled across a first carrier of the set of multiple carriers during a first transmission window that may be aligned in time with a second transmission window of a second carrier of the set of multiple carriers.

In some examples of the method, apparatuses, computer program and non-transitory computer-readable medium described herein, receiving the first control message may include operations, features, means, or instructions for receiving the first control message indicating that the UE may be capable of maintaining phase continuity for a set of multiple physical uplink channels scheduled across a set of multiple transmit chains.

In some examples of the method, apparatuses, computer program and non-transitory computer-readable medium described herein, the set of multiple physical uplink channels may include operations, features, means, or instructions for a set of multiple physical uplink shared channels, a set of multiple physical uplink control channels, or both.

In some examples of the method, apparatuses, computer program and non-transitory computer-readable medium described herein, the set of multiple physical uplink channels may include operations, features, means, or instructions for a set of multiple repetitions of a same physical uplink channel, or two or more different physical uplink channels scheduled by a set of multiple downlink control information messages, or any combination thereof.

DETAILED DESCRIPTION

Figure 1:
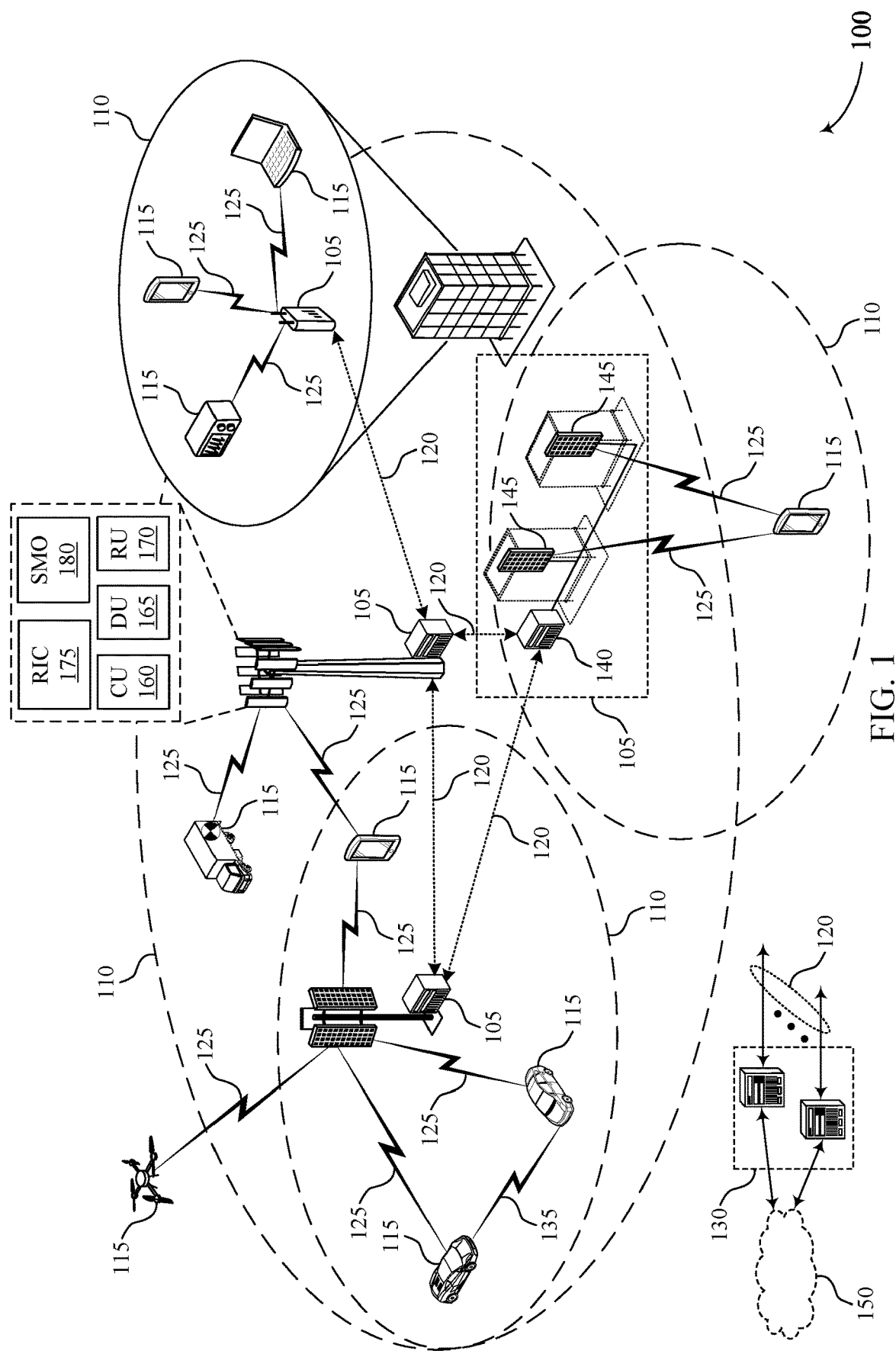
FIG. 1 illustrates an example of a wireless communications system that supports capability signaling transmissions in accordance with aspects of the present disclosure.

Some wireless communications systems may support multiple uplink transmissions (e.g., repetitions of a single message on a physical uplink shared channel (PUSCH) or physical uplink control channel (PUCCH), or different data or control messages transmitted on a PUSCH or PUCCH) while maintaining phase continuity across respective transmissions in different time slots. Maintaining the phase continuity may be referred to as bundling and may include using a same set of parameters for a respective set of uplink transmissions (e.g., a same frequency resource, a same transmit power, a same spatial transmit relation, a same antenna port(s), a same precoding, etc.). Maintaining phase continuity may include transmitting a first transmission and a second transmission such that the two transmissions do not include any discontinuities that exceed a threshold. For example, a difference between the phase of the first transmission and the phase of the second transmissions satisfies a threshold phase difference (e.g., is about the same or within a threshold difference) at a boundary (e.g., a slot boundary) between the two transmissions.

Bundling one or more respective sets of transmissions may support joint processing of demodulation reference signals (DMRS) at a base station. The base station may perform joint channel estimation across a set of uplink channels received in multiple time slots (e.g., time intervals such as slots, mini-slots, sub-slots, symbols, frames, sub-frames, or the like) provided that the UE maintains phase continuity across the set of uplink channels. The base station may generate a joint channel estimate for the multiple time slots using the DMRS transmissions transmitted by the UE within the set of uplink channels, and demodulate the multiple uplink transmissions received within the set of uplink channels using the joint channel estimate.

In some examples, the uplink transmissions may be consecutive in a single time slot, consecutive across multiple time slots, non-consecutive in a single time slot (e.g., with a time gap between at least two of the uplink transmissions), non-consecutive across multiple time slots (e.g., consecutive or non-consecutive time slots), or the like. Some UEs (e.g., devices with advanced processing or computational capabilities) may be capable of maintaining phase continuity in any of the above-mentioned scenarios. However, some UEs may only be capable of maintaining phase continuity if the uplink transmissions are scheduled to conform to a set of limitations or rules.

Conventional systems may not support techniques for determining whether a UE is capable of maintaining phase continuity in a variety of situations. If a base station is unaware of the UE capability, then it may inefficiently schedule multiple uplink transmissions for joint channel estimation where a UE is unable to maintain phase continuity. For example, if the base station schedules a UE to transmit multiple bundled uplink transmissions (e.g., under the erroneous assumption that the UE is capable of maintaining phase continuity across the full set of scheduled uplink transmissions), then the UE may fail to maintain phase continuity for the scheduled uplink transmissions, which may result in a failed joint channel estimation resulting from phase noise or phase jumps, poor reception at the base station, failed transmissions, retransmissions, increased system latency, or the like. However, if the base station erroneously determines that an advanced UE with increased capabilities is not capable of maintaining phase continuity in some or all use cases, then the base station may avoid scheduling the UE for multiple uplink transmissions in some or all of the use cases described herein. This may result in inefficient use of resources, and failure to fully take advantage of the computational and system efficiencies available to the advanced UE.

Techniques are described for a UE reporting its uplink transmission bundling capability for maintaining phase continuity over multiple physical uplink channels (e.g., multiple uplink transmissions on a physical uplink channel, for instance DMRSs). In some examples, the UE may indicate that it is capable of maintaining phase continuity across a set of multiple uplink transmissions (e.g., multiple physical uplink channels) even if there is an intervening time gap between at least one pair of consecutive bundled physical uplink channels. The UE may transmit a control message including capability information, and the base station may configure uplink transmissions accordingly so that the UE may maintain phase continuity for the set uplink channels over the intervening time gap. The capability information may include indications of whether the UE can maintain phase continuity across a set of uplink transmission in a same slot or across multiple slots. The capability information may also indicate whether the UE can maintain phase continuity if uplink or downlink signaling are scheduled within the intervening time gap between adjacent uplink transmissions, if the UE can maintain phase continuity over the set of uplink channels when switching between transmit chains or component carriers (CCs) for transmission of one or more uplink channels, if the UE can maintain phase continuity over the set of uplink channels that are transmitted across different carriers, or the like. The capability information may be indicated on a per band basis, a per subcarrier spacing basis, a per modulation and coding scheme (MCS) basis, or the like. In some examples, the UE may indicate a maximum duration for the time gap, or a maximum amount of the time gap during which uplink or downlink singling may be scheduled, a minimum time between the end of an intervening uplink or downlink signal and a next uplink transmission, or any combination thereof.

Aspects of the disclosure are initially described in the context of wireless communications systems. Aspects of the disclosure are further exemplarily illustrated by and described with reference to resource configurations, DMRS bundling configurations, timelines, and process flows. Aspects of the disclosure are further illustrated by and described with reference to apparatus diagrams, system diagrams, and flowcharts that relate to capability signaling for uplink transmissions.

FIG. 1 illustrates an example of a wireless communications system 100 that supports capability signaling for uplink transmissions in accordance with aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein. In some examples, the wireless communications system 100 may support enhanced broadband communications, ultra-reliable (e.g., mission critical) communications, low latency communications, communications with low-cost and low-complexity devices, or any combination thereof.

The network entities 105 may be dispersed throughout a geographic area to form the wireless communications system 100 and may be devices in different forms or having different capabilities. In various examples, a network entity 105 may be referred to as a network element, a mobility element, a radio access network (RAN) node, or network equipment, among other nomenclature. In some examples, network entities 105 and the UEs 115 may wirelessly communicate via one or more communication links 125 (e.g., radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the network entities 105, or network equipment (e.g., core network nodes, relay devices, integrated access and backhaul (IAB) nodes, or other network equipment), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, the network entities 105 may interface with the core network 130 through one or more backhaul communication links 120 (e.g., in accordance with an S1, N2, N3, or other interface protocol). In some examples, network entities 105 may communicate with one another over backhaul communication links 120 (e.g., in accordance with an X2, Xn, or other interface protocol) either directly (e.g., directly between network entities 105), or indirectly (e.g., via a core network 130), or both. In some examples, the backhaul links 120 may be or include one or more wireless links. In some examples, network entities 105 (e.g., base stations) may communicate with one another via a midhaul communication link (e.g., in accordance with a midhaul interface protocol) or a fronthaul communication link (e.g., in accordance with a fronthaul interface protocol), or any combination thereof. The backhaul communication links 120 may be or include one or more wireless, midhaul communication links, or fronthaul communication links may be or include one or more wired links (e.g., an electrical link, an optical fiber link), one or more wireless links (e.g., a radio link, a wireless optical link), among other examples or various combinations thereof. A UE 115 may communicate with the core network 130 through a communication link.

One or more of the network entities 105 (e.g., base stations) described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, 5G NB, a next-generation eNB (ng-eNB), a Home NodeB, a Home eNodeB, or other suitable terminology). In some examples, a network entity 105 (e.g., a base station) may be implemented in an aggregated (e.g., monolithic, standalone) base station architecture, which may be configured to utilize a protocol stack that is physically or logically integrated within a single network entity 105 (e.g., a single RAN node, such as a base station).

In some examples, one or more network entities 105 (e.g., one or more base stations or aspects of network entities 105) may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to DUs 165 or RUs 170, and the DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to DUs 165 via a midhaul communication link (e.g., F1, F1-c, F1-u), and a DU 165 may be connected to one or more RUs 170 via a fronthaul communication link (e.g., open fronthaul (FH) interface). In some examples, a midhaul communication link or a fronthaul communication link may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes) may be partially controlled by each other. One or more IAB nodes may be referred to as a donor entity or an IAB donor. The DUs 165 or one or more RUs 170 may be partially controlled by CUs 160 associated with a donor network entity 105 (e.g., a donor base station). The one or more donor network entities 105 (e.g., IAB donors) may be in communication with one or more additional network entities 105 (e.g., IAB nodes) via supported access and backhaul links (e.g., backhaul communication links 120). IAB nodes may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node used for access via the DU 165 of the IAB node (e.g., referred to as virtual IAB-MT (vIAB-MT)). In some examples, the IAB nodes may include DUs 165 that support communication links with additional entities (e.g., IAB nodes, UEs 115) within the relay chain or configuration of the access network (e.g., downstream). In such cases, one or more components of the disaggregated RAN architecture (e.g., one or more IAB nodes or components of IAB nodes) may be configured to operate according to the techniques described herein.

In the case of the techniques described herein applied in the context of a disaggregated RAN architecture, one or more components of the disaggregated RAN architecture may be configured to support phase tracking reference signals and demodulation reference signals for joint channel estimation as described herein. For example, some operations described as being performed by a UE 115 or a network entity 105 (e.g., a base station) may additionally, or alternatively, be performed by one or more components of the disaggregated RAN architecture (e.g., IAB nodes, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that may coordinate operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station, a CU 160, a DU 165, a RU 170) of a RAN communicating with another device (e.g., directly or via one or more other network entities 105).

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a network entity 105 (e.g., a base station), or downlink transmissions (e.g., forward link transmissions) from a network entity 105 to a UE 115, uplink transmissions (e.g., return link transmissions) from a network entity 105 to a UE 115, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 may be movable and therefore provide communication coverage for a moving geographic coverage area 110. In some examples, different geographic coverage areas 110 associated with different technologies may overlap, but the different geographic coverage areas 110 may be supported by the same network entity 105. In other examples, the overlapping geographic coverage areas 110 associated with different technologies may be supported by different network entities 105. The wireless communications system 100 may include, for example, a heterogeneous network in which different types of the network entities 105 provide coverage for various geographic coverage areas 110 using the same or different radio access technologies.

The wireless communications system 100 may support synchronous or asynchronous operation. For synchronous operation, the network entities 105 may have similar frame timings, and transmissions from different network entities 105 may be approximately aligned in time. For asynchronous operation, the network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a network entity 105. Other UEs 115 in such a group may be outside the geographic coverage area 110 of a network entity 105 or be otherwise unable to receive transmissions from a network entity 105. In some examples, groups of the UEs 115 communicating via D2D communications may utilize a one-to-many (1:M) system in which each UE 115 transmits to every other UE 115 in the group. In some examples, a network entity 105 facilitates the scheduling of resources for D2D communications. In other cases, D2D communications are carried out between the UEs 115 without the involvement of a network entity 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a network entity 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or network entity 105 may be distributed across various network devices (e.g., radio heads and ANCs) or consolidated into a single network device (e.g., a network entity 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity (e.g., a base station) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a number of rows and columns of antenna ports that the network entity 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device and/or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device and/or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 (e.g., a base station) and/or a UE 115 may use beam sweeping techniques as part of beam forming operations. For example, a network entity 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times in different directions. For example, the network entity 105 may transmit a signal according to different beamforming weight sets associated with different directions of transmission. Transmissions in different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a network entity 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the network entity 105 in different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or radio frequency beamforming to generate a combined beam for transmission (e.g., from a network entity 105 to a UE 115). The UE 115 may report feedback that indicates precoding weights for one or more beam directions, and the feedback may correspond to a configured number of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a network entity 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the network entity 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a network entity 105 or a core network 130 supporting radio bearers for user plane data. At the physical layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Generally, a UE 115 may report its uplink transmission bundling capability for maintaining phase continuity over multiple physical uplink channels (e.g., multiple uplink transmissions on one or more physical uplink channels). The uplink transmissions may be DMRSs. The UE 115 may transmit a control message including capability information, and the network entity may configure physical uplink channels accordingly so that the UE 115 may maintain uplink phase continuity over an intervening time gap between bundled physical uplink channels. In some examples, the UE 115 may indicate that it is capable of maintaining phase continuity across multiple uplink transmissions on one or more physical uplink channels even if there is an intervening time gap between at least one pair of consecutive uplink transmissions. The capability information may include indications of whether the UE 115 can maintain phase continuity across a set of uplink transmissions in a same slot or across multiple slots. The capability information may also indicate whether the UE can maintain phase continuity over the set of uplink channels if uplink or downlink signaling is scheduled within the intervening time gap between at least one consecutive pair of uplink channels, if the UE 115 can maintain phase continuity over the set of uplink channels when switching between transmit chains or component carriers (CCs) for transmission of one or more uplink channels, if the UE 115 can maintain phase continuity over the set of uplink channels that are transmitted across different carriers, or the like. The capability information may be indicated on a per band basis, a per subcarrier spacing basis, a per modulation and coding scheme (MCS) basis, or the like. In some examples, the UE 115 may indicate a maximum duration for the time gap, or a maximum amount of the time gap during which uplink or downlink singling may be scheduled, a minimum time between the end of an intervening uplink or downlink signal and a next uplink transmission, or any combination thereof.

Figure 2:
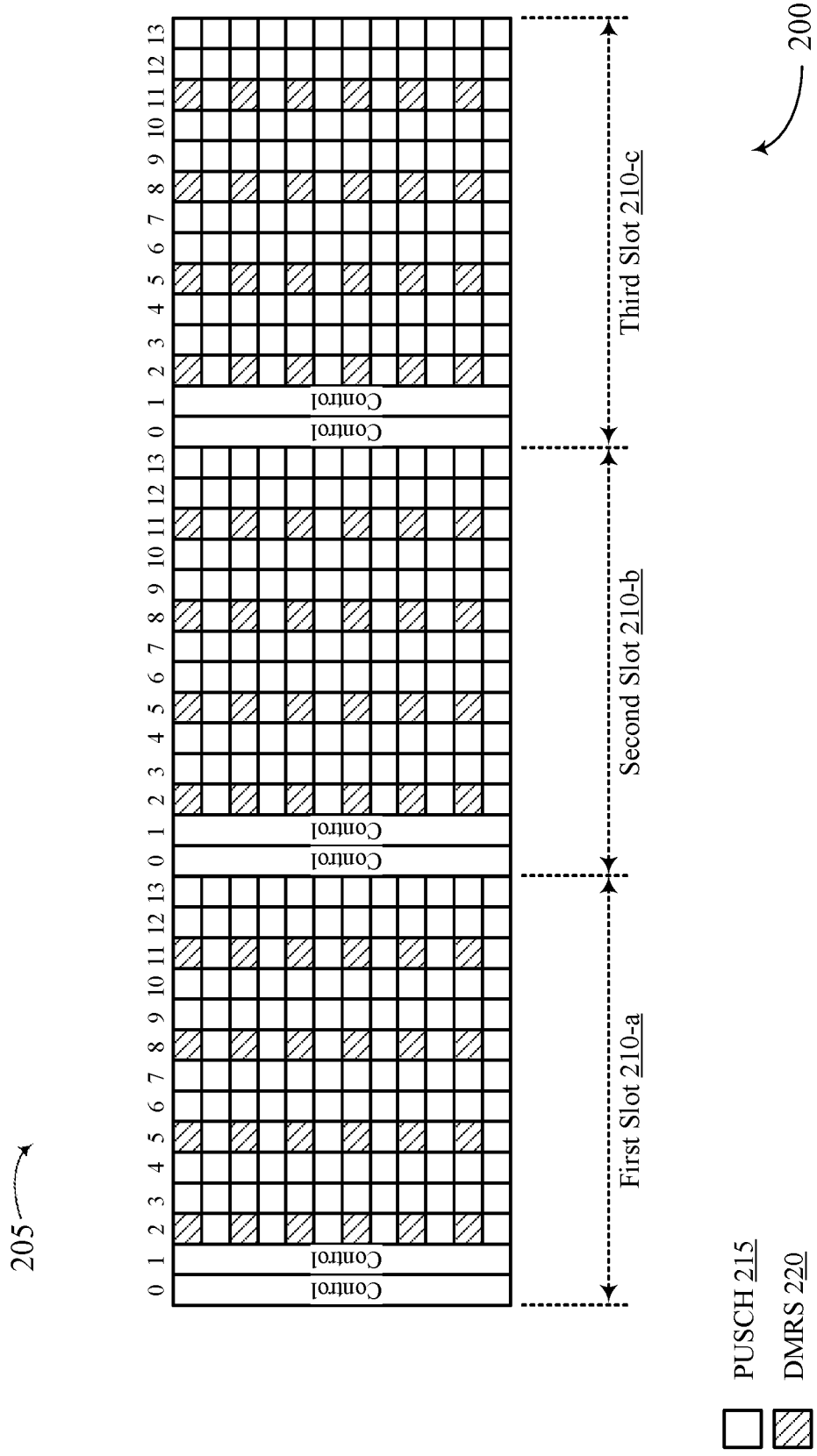
FIG. 2 illustrates an example of a resource configuration in accordance with aspects of the present disclosure.

FIG. 2 illustrates an example of a resource configuration 200 that supports capability signaling for uplink transmissions in accordance with aspects of the present disclosure. In some examples, resource configuration 200 may implement, or be implemented by, aspects of wireless communications system 100. The resource configuration 200 illustrates a set of resources 205 across multiple slots 210 which may be used for transmission/reception of phase-coherent transmissions such as for example DMRSs. Although illustrated with reference to slots 210, techniques described with reference to FIG. 2 elsewhere herein, may also be performed for any transmission time interval (TTI) (e.g., slots, a mini-slots, sub-slots, symbols, frames, subframes, or the like). Additionally, although the resource configuration 200 includes PUSCH transmissions 215, techniques described herein may also be performed with reference to a PUCCH.

As noted herein, some wireless communications systems (e.g., wireless communications system 100) may enable wireless devices (e.g., UEs 115) to transmit bundled uplink transmissions such as DMRSs 220 having phase continuity (e.g., phase-coherent DMRSs 220) to improve channel estimation. For example, a UE 115 may transmit a set of DMRSs 220 having phase continuity to a network entity 105 within a set of resources which are known by both the UE 115 and the network entity 105. In this example, because the DMRSs 220 having phase continuity are received by the network entity 105 within a set of known resources, the network entity 105 may be configured to aggregate the DMRSs 220 having phase continuity to determine a more accurate channel estimation of the channel between the UE 115 and the network entity 105. The network entity 105 may then be able to use the improved channel estimation to demodulate (e.g., decode) other transmissions (e.g., PUSCH transmissions 215) received from the UE 115 via the channel. In some aspects, the PUSCH transmissions 215 may also be transmitted with phase continuity across the respective slots 210.

Some wireless communications systems have enabled DMRSs 220 to be bundled only within a single TTI, but not across multiple TTIs. For example, in some wireless communications systems, a UE 115 may be configured to transmit a set of DMRSs 220 having phase continuity within the first slot 210-a, but may be unable to maintain phase coherency for DMRSs 220 transmitted in different slots 210. For instance, in some wireless communications systems, a UE 115 may be unable to maintain phase continuity across DMRSs 220 which are transmitted within the first slot 210-a and the second slot 210-b. In this regard, phase continuity may be maintained for DMRSs 220 within each respective slot 210, but may not be maintained for DMRSs 220 across multiple slots 210.

In some other wireless communications systems (e.g., wireless communications system 100), DMRSs 220 may be bundled across multiple slots and/or across multiple transmissions (e.g., PUCCH or PUSCH transmissions), such that phase continuity may be maintained across multiple slots 210 and/or across the multiple transmissions. For example, in the wireless communications system 100, a UE 115 may be configured to transmit a DMRSs 220 within the first slot 210-a, the second slot 210-b, and the third slot 210-c, where phase continuity is maintained across each of the slots 210-a, 210-b, and 210-c. In this example, a network entity 105 may be configured to jointly process (e.g., aggregate) the phase-coherent DMRSs 220 received across the slots 210-a, 210-b, and 210-c when performing channel estimation (e.g., cross-slot channel estimation), and may use a determined channel estimate to demodulate the PUSCH transmissions 215 (e.g., PUSCH transmissions 215 having phase continuity) received across the slots 210-a, 210-b, and 210-c.

In some aspects, one or more parameters or characteristics may be maintained for phase-coherent DMRSs 220 which are bundled across one or more slots 210. Parameters which may be used to maintain phase continuity for DMRSs 220 associated with one or more PUSCH transmissions 215 may include, but are not limited to, phase, frequency allocations, transmission powers, spatial transmission relations, antenna ports used for transmission, precoding schemes, and the like. For example, as illustrated in FIG. 2, in cases where DMRSs 220 are bundled across the first slot 210-a, the second slot 210-b, and the third slot 210-c, the frequency allocation and transmit for the DMRSs 220 within each respective slot 210 may remain the same. Conversely, phase-continuity may not be maintained across slots 210 and/or other transmissions (e.g., phase discontinuity) in cases where DMRSs 220 in respective slots 210 exhibit one or more different parameters (e.g., different phases, different frequency resource allocations within or between PUSCH slots, non-contiguous time resource allocation of PUSCH slots, different transmit powers, different antenna ports, different timing advances).

In some aspects, the ability to bundle DMRSs 220 across multiple slots 210 (e.g., maintain phase coherency for DMRSs 220 across multiple slots 210) and/or across multiple transmissions (e.g., multiple PUSCH transmissions 215) may enable improved channel estimation at a receiving device (e.g., network entity 105). In particular, by enabling for larger quantities of DMRSs 220 to be aggregated across multiple slots 210, a network entity 105 may be able to determine a more comprehensive channel estimation (e.g., cross-slot channel estimation), which may improve an ability of the network entity 105 to demodulate received PUSCH transmissions 215.

In some examples, different UEs 115 may have different capabilities. For example, some UEs 115 may be capable of maintaining phase continuity over a set of uplink channels across a number of consecutive slots 210 or a number of non-consecutive slots. Some UEs 115 may be able to maintain phase continuity across different CCs, or while switching between transmit chains. Some UEs 115 may be able to maintain phase continuity over a set of uplink channels for a set of uplink transmissions within or across slots 210, even if uplink or downlink transmissions are intermediately scheduled. For instance, the UE 115 may be able to maintain phase continuity for uplink PUSCH transmissions 215 during slot 210-a and slot 210-b, even if a different uplink transmission is scheduled during slot 210-b. Other UEs 115 may have more limited capabilities, and may only be able to maintain phase continuity over a set of uplink channels if one or more rules or conditions are satisfied. For instance, such a UE 115 may be able to maintain phase continuity for back-to-back (e.g., consecutive) uplink channels scheduled within slot 210-a or across slot 210-a and slot 210-b, but may not be able to maintain phase continuity if an intervening uplink or downlink transmissions is scheduled between consecutive uplink channels. Additional limitations may also apply to such a UE 115, as described in greater detail with reference to FIGS. 3-7.

In some examples, a UE 115 may transmit bundling capability information to a network entity. The network entity may then schedule multiple uplink channels according to the bundling capability information (e.g., such that the UE is able to maintain phase continuity across the scheduled multiple uplink channels without exceeding its capability to permit the network entity to perform joint channel estimation).

Bundling capabilities may be different for different use cases or bundling configurations, as described in greater detail with reference to FIG. 4.

Figure 3:
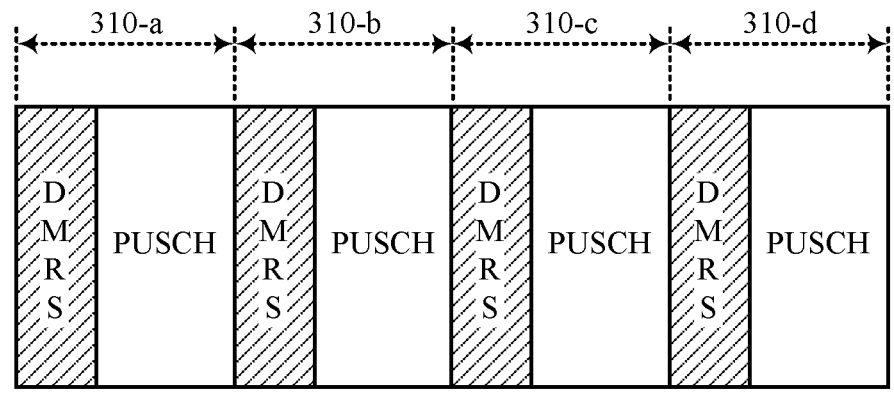
FIG. 3 illustrates an example of a resource configuration in accordance with aspects of the present disclosure.
Figure 3:
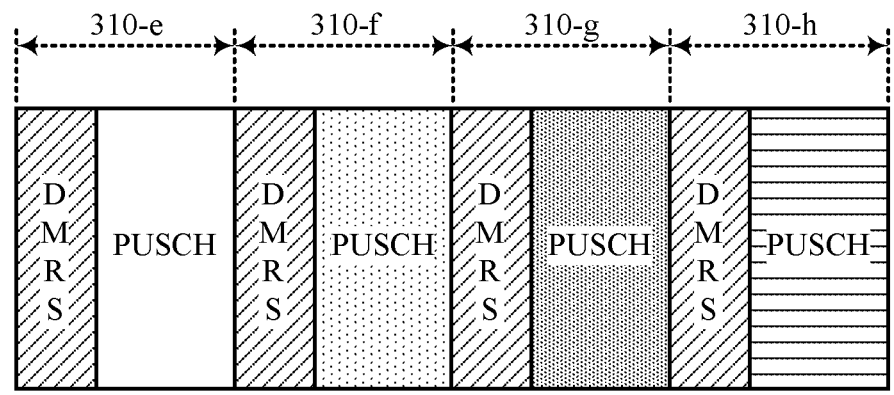

FIG. 3 illustrates an example of a resource configuration 300 that supports capability signaling for uplink transmissions in accordance with aspects of the present disclosure. In some examples, resource configuration 300 may implement, or be implemented by, aspects of wireless communications system 100, resource configuration 200, or both.

As noted previously herein, bundling DMRSs having phase continuity across one or more slots 310 and/or across one or more PUSCH transmissions may enable a receiving device to aggregate the bundled DMRSs and perform more accurate channel estimation, which may improve demodulation of other received transmissions.

For example, as shown in the resource allocation scheme 305-a, a set of DMRSs having phase continuity (e.g., phase-coherent DMRSs) may be transmitted along with a set of repetitions of a PUSCH transmission across multiple slots 310. In other words, phase continuity is maintained for the bundled DMRSs across the first slot 310-a, the second slot 310-b, the third slot 310-c, and the fourth slot 310-d. Moreover, phase continuity may be maintained for the bundled DMRSs across the respective PUSCH repetitions. In this example, the PUSCH transmissions in each slot 310 may include a repetition of the same PUSCH transmission. In other words, each PUSCH transmission illustrated in the resource allocation scheme 305-a may include the same data payload (e.g., same transport block). The respective PUSCH transmissions may also be transmitted with phase continuity across the respective slots 310. In this example, maintaining phase continuity across the DMRSs bundled across the multiple slots 310 and/or PUSCH transmissions may enable a receiving device (e.g., network entity 105) to perform more accurate channel estimation, which may enable the receiving device to more accurately and efficiently demodulate (e.g., decode) the multiple repetitions of the PUSCH transmission.

In additional or alternative aspects, bundling DMRSs having phase continuity across multiple slots may enable efficient demodulation of different PUSCH transmissions. For example, as shown in the resource allocation scheme 305-b, a set of DMRSs having phase continuity may be transmitted along with a set PUSCH transmissions across multiple slots 310. In other words, phase continuity is maintained for the bundled DMRSs across the first slot 310-e, the second slot 310-f, the third slot 310-g, and the fourth slot 310-h.

Additionally, or alternatively, phase continuity is maintained for the bundled DMRSs across the respective PUSCH transmissions. In this example, the PUSCH transmissions in each slot 310 may include different PUSCH transmissions (e.g., different data payloads, different transport blocks), which may be scheduled by different scheduling grants, DCI messages, and the like. For example, the PUSCH transmission in the first slot 310-e may be different from the PUSCH transmissions in the second slot 310-f, the third slot 310-g, the fourth slot 310-h, or any combination thereof. For instance, the first PUSCH transmission in the first slot 310-a may be scheduled by a first DCI message, and the second PUSCH transmission in the second slot 310-b may be scheduled by a second DCI message. As such, the four PUSCH transmissions within each of the respective slots 310 may include different PUSCH transmissions (e.g., different data payloads, different transport blocks) which are scheduled using different scheduling grants (e.g., four separate DCI messages scheduling the four PUSCH transmissions, respectively). In some cases, the PUSCH transmissions may also be transmitted with phase continuity across the respective slots 310. In this example, maintaining phase continuity across the DMRSs bundled across the multiple slots 310 and/or multiple PUSCH transmissions may enable a receiving device (e.g., network entity 105) to perform more accurate channel estimation (e.g., cross-slot channel estimation), which may enable the receiving device to more accurately and efficiently demodulate (e.g., decode) the different PUSCH transmissions received in each respective slot 310.

PUSCH or PUCCH DMRS bundling may be applied to PUSCH or PUCCH repetitions over multiple slots, PUSCH or PUCCH transmissions carrying different transport blocks (TBs) (e.g., scheduled by separate downlink control information (DCI) messages), or the like. As described herein with reference to FIG. 2 and FIG. 3, a UE 115 may be able to perform DMRS bundling for joint channel estimation if it can maintain phase continuity across associated PUSCH or PUCCH symbols. In some examples, phase continuity may not be a prerequisite to successful demodulation if a network entity is capable of compensating for phase errors. In other examples, successful joint channel estimation may rely on transmission of multiple uplink transmissions (e.g., on a PUCCH or PUSCH) maintaining phase continuity.

Figure 4:
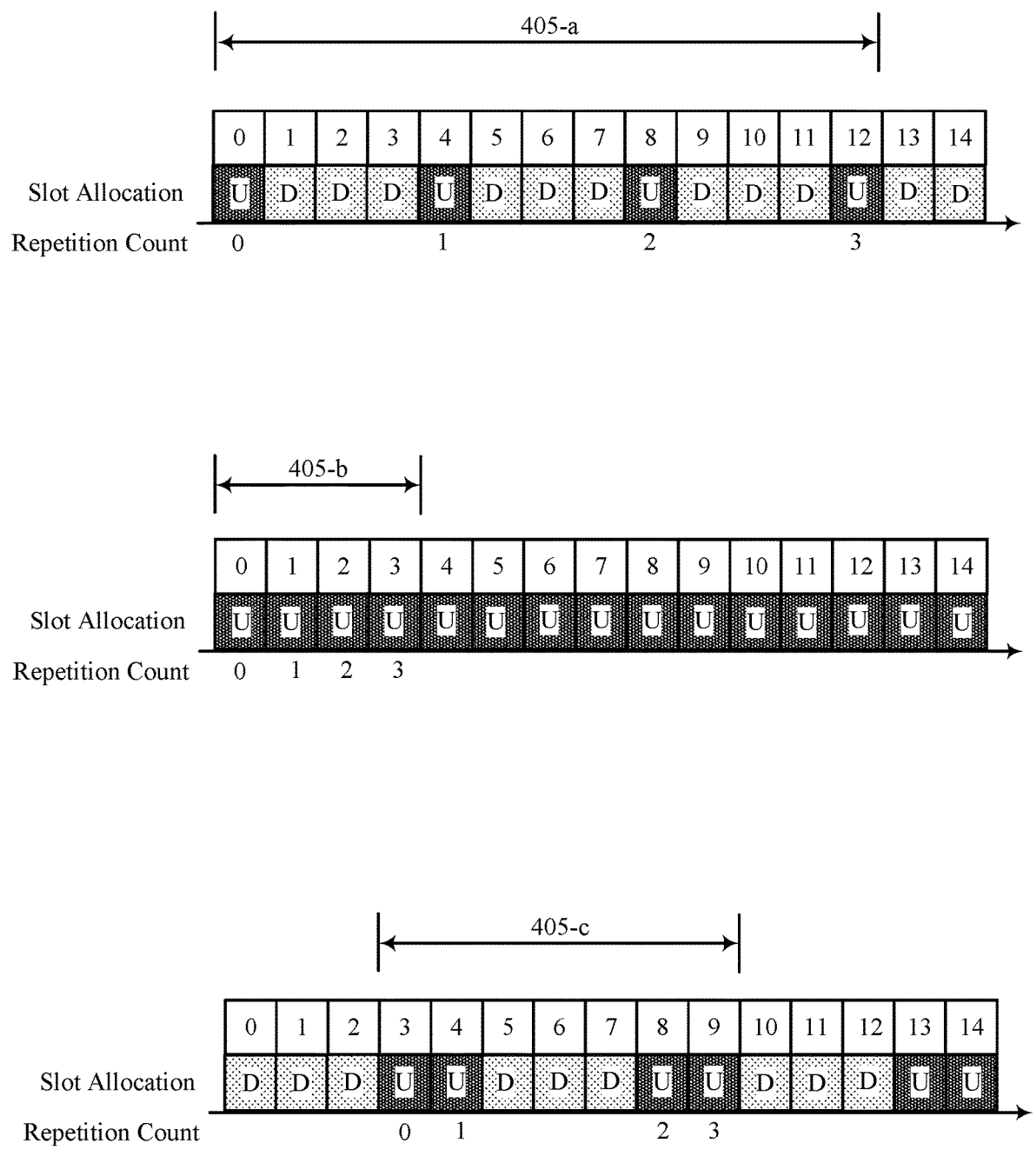
FIG. 4 illustrates an example of a demodulation reference signal bundling scheme in accordance with aspects of the present disclosure.

Phase discontinuity may result from one or more scenarios described herein (e.g., with reference to FIG. 4). For example, phase discontinuity potentially may occur due to non-contiguous time resource allocation. In some examples, if a timing gap between PUSCH symbols or slots is larger than a threshold time, or if other uplink signals (e.g., PUCCH, PUSCH sounding reference signals (SRSs), etc.) or downlink signals (e.g., PDCCH, PDSCH, synchronization signal blocks (SSBs), channel state information (CSI) reference signals (RSs) etc.) is scheduled between consecutive uplink transmissions for joint channel estimation, then a UE 115 potentially may not be able to maintain phase continuity across the set of uplink channels. Similarly, a UE 115 potentially may not be able to maintain phase continuity for a set of uplink channels that have different transmit powers, different transmit waveforms, or are allocated different frequency resources.

However, a threshold time between consecutive uplink transmissions for which phase continuity can be maintained may be different for some UEs 115. Similarly, some UEs may support coherent transmission of multiple uplink channels even if uplink signaling, downlink signaling, or both, are scheduled between consecutive uplink transmissions. If a network entity has no knowledge of which UEs 115 are capable of maintaining phase continuity in which use cases, then the network entity may inefficiently schedule uplink transmissions. Instead, as described with reference to FIGS. 5-8, a UE 115 may transmit bundling capability information to the network entity, and the network entity may schedule uplink transmission accordingly to permit the UE 115 to maintain phase continuity across a set of uplink channels allowing the network entity 105 to perform joint channel estimation.

FIG. 4 illustrates an example of a DMRS bundling scheme 400 that supports capability signaling for uplink transmissions in accordance with aspects of the present disclosure. DMRS bundling scheme 400 may implement, or may be implemented by, one or more wireless devices, such as a UE 115 and a network entity 105, which may be examples of corresponding devices described with reference to FIGS. 1-3.

A network entity 105 may configure a UE 115 with time slot formatting information (e.g., resource allocation information). For example, the UE 115 may be configured with a time-division multiplexing (TDM) configuration, where each time slot (e.g., each TTI, such as a slot, sub-slot, mini-slot, symbol, or the like) is allocated as an uplink time slot (e.g., U), a downlink time slot (e.g., D), or a special (e.g., flexible) time slot (e.g., S). Some or all symbols in an S TTI may be allocated for uplink signaling, and some or all symbols in the S TTI may be allocated for downlink signaling. In some examples, a TDM resource allocation may include a pattern of U, D, and S TTIs. An illustrative example pattern may be: DDDSUDDSUU. Such a pattern may repeat itself over time (e.g., across various time slots). A span 405 may define an amount of time spanning a set of uplink transmissions to be transmitted while maintaining phase continuity for joint channel estimation. A span 405 of repetitions may depend on a slot pattern and how symbols or slots are to be used (e.g., U, D, or S).

In some cases, an example pattern may be UDDD, which may repeat itself over time. A network entity 105 may configure the UE 115 with one or more uplink transmissions (e.g., four uplink transmissions during 4 different slots). The multiple uplink transmissions may be distinct transmissions, or may be repetitions of a single transmission. In the example where the slot allocation includes a UDDD pattern, four repetitions of an uplink transmissions may be located in slots 0, 4, 8, and 12, respectively. In such examples, the multiple uplink transmissions (e.g., repetitions), may cover a span 405-*a* in time. Some UEs 115 may be capable of maintaining phase continuity across such a span 405-*a*. However, other UEs 115 may not be capable of maintaining phase continuity across so much time, across such a large time gap (e.g., three slots between each consecutive uplink transmissions), or across intervening downlink transmissions (e.g., during intervening D slots).

In some cases, the network entity 105 may configure the UE 115 with an FDM configuration. In such examples, each time slot (e.g., slot, mini-slot, sub-slot, symbol, or the like) in a set of frequency resources (e.g., a PUSCH or PUCCH) may be allocated for uplink signaling (e.g., U). The UE may transmit scheduled uplink signaling during each U time slot. For instance, the network entity may configure the UE to transmit 4 repetitions of an uplink message (e.g., an initial transmission of the uplink message followed by 3 repetitions of the uplink message) during slots 0-3. In such examples, the multiple uplink transmissions (e.g., repetitions), may cover a span 405-*b* in time. Some UEs 115 may be capable of maintaining phase continuity across such a span 405-*b*. However, other UEs 115 may not be capable of maintaining phase continuity across span 405-*b*. Some UEs 115 may be capable of maintaining phase continuity even if intervening uplink transmissions (e.g., for which the UE 115 is not expected to maintain phase continuity) are scheduled between uplink transmissions. Other UEs 115 may not be capable of maintaining phase continuity across non-consecutive U slots.

In some cases, an example pattern may be DDDUU, which may repeat itself over time. A network entity 105 may configure the UE 115 with one or more uplink transmissions (e.g., four uplink transmissions during 4 different slots). The multiple uplink transmissions may be distinct transmissions, or may be repetitions of a single transmission. In the example where the slot allocation includes a DDDUU pattern, four repetitions of an uplink transmissions may be located in slots 3, 4, 8, and 9, respectively. In such examples, the multiple uplink transmissions (e.g., repetitions), may cover a span 405-*c* in time. Some UEs 115 may be capable of maintaining phase continuity across such a span 405-*a*. However, other UEs 115 may not be capable of maintaining phase continuity across so much time, across such a large time gap (e.g., three slots between consecutive uplink transmissions during slot 4 and slot 8), or across intervening downlink transmissions (e.g., during intervening D slots). Some UEs 115 may be capable of maintaining phase continuity during slots 3 and 4, but may not be capable of maintaining phase continuity between slots 4 and 8.

A network entity 105 may more efficiently schedule uplink transmissions for which the UE 115 is expected to maintain phase continuity based on bundling capability information transmitted by the UE, as further described with reference to FIGS. 5-8. Various use cases in which a UE can or cannot maintain phase continuity are described in greater detail with reference to FIG. 5. Additional considerations and information that may be included in bundling capability information is described in greater detail with reference to FIGS. 5-8.

Figure 5:
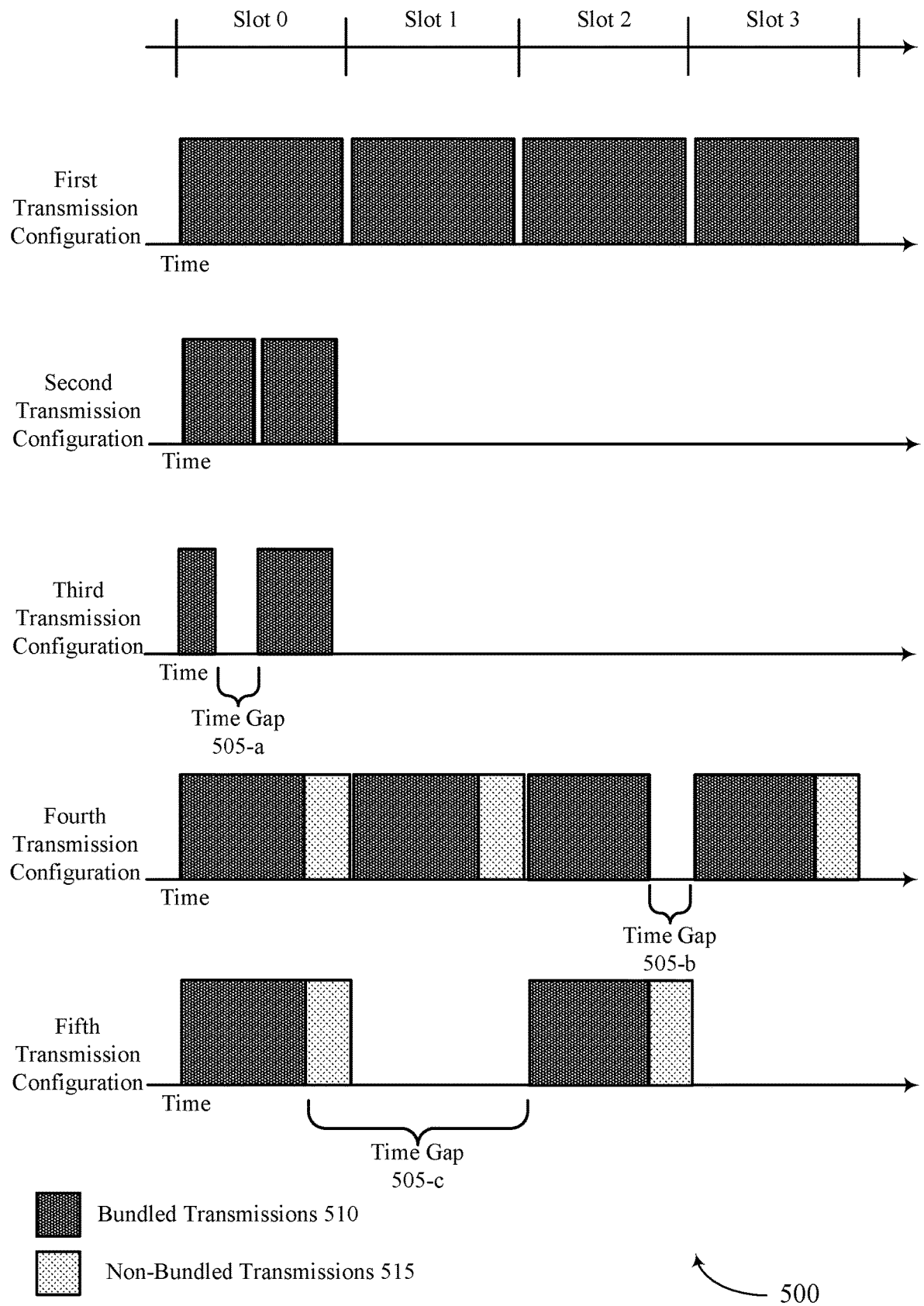
FIG. 5 illustrates an example of a demodulation reference signal bundling configuration in accordance with aspects of the present disclosure.

FIG. 5 illustrates an example of a timeline 500 that supports capability signaling for uplink transmissions in accordance with aspects of the present disclosure. Timeline 500 may implement, or may be implemented by, one or more wireless devices, such as a UE 115 and a network entity 105, which may be examples of corresponding devices described with reference to FIGS. 1-4.

In some examples, as described herein, a UE 115 may report its bundling capability to a network entity 105. The network entity 105 may then schedule uplink transmissions (e.g., according to time slot formatting information as described with reference to FIG. 4), according to the bundling capability information, to enable the UE 115 to maintain phase continuity across a set of uplink channels when joint channel estimation is desired. Bundling capability information may include an indication of whether a UE can maintain phase continuity in one or more use cases (e.g., transmission configurations). The UE 115 may include the bundling capability information in a control message transmitted to the network entity 105, as described in greater detail with reference to FIG. 8.

The UE 115 may indicate in the bundling capability information that it can or cannot support DMRS bundling (e.g., maintain phase continuity) across multiple physical uplink channel transmissions (e.g., on a PUCCH or a PUSCH) that satisfy one or more conditions. For example, the UE 115 may indicate that it can or cannot maintain phase continuity for back-to-back (e.g., consecutive) uplink transmission across multiple time slots (e.g., slots, mini-slots, sub-slots, symbols, frames, subframes, or the like) in a first transmission configuration. In such examples, the network entity may schedule bundled transmissions 510 in consecutive slots in which the UE 115 is capable of maintaining phase continuity.

The UE 115 may indicate in its bundling capability information that it is (or is not) capable of maintaining phase continuity across a set of uplink channels in back-to-back (e.g., consecutive) transmissions on an physical uplink channel within a single time slot in a second transmission configuration. In such examples, the network entity 105 may schedule consecutive bundled transmissions 510 within individual time slots in which the UE 115 is capable of maintaining phase continuity.

In cases where the UE 115 is capable of maintaining phase continuity across a set of uplink channels for back-to-back bundled transmissions 510 (e.g., the first transmission configuration, the second transmission configuration, or the like), the UE 115 may indicate a maximum bundling duration (e.g., a maximum span 405). The maximum bundling duration may be indicated in absolute time, number of symbols, number of slots, an offset value, or the like. The maximum bundling duration may be indicated on a per modulation order (e.g., MCS) basis, on a per sub-carrier spacing basis, a per band basis, or the like.

The UE 115 may indicate in its bundling capability information that it is (or is not) capable of maintaining phase continuity across a set of uplink channels for non-back-to-back (e.g., non-consecutive) bundled transmissions 510 within a time slot in a third transmission configuration. For instance, the UE 115 may indicate in the bundling capability information that it is capable of maintaining phase continuity for multiple bundled transmissions 510 within a time slot (e.g., time slot 0), even if a pair of the bundled transmissions 510 is separated by a time gap 505-a. In some examples, as described in greater detail with reference to FIGS. 6-8, the UE 115 may further indicate a threshold duration for time gap 505-a in the bundling capability information. The threshold duration for time gap 505-a may indicate a maximum amount of time between two consecutive bundled transmissions 510. If uplink transmissions are scheduled within a same time slot, but are separated by an amount of time that exceeds the threshold duration for time gap 505-a, then the UE 115 may not be able to maintain phase continuity within the time slot. The network entity 105 may schedule multiple bundled transmissions 510 within individual time slots based on the received bundling capability information. In some examples, the UE 115 may schedule multiple bundled transmissions 510 that are separated by no more than the threshold duration for time gap 505-a.

The UE 115 may indicate in its bundling capability information that it is (or is not) capable of maintaining phase continuity for non-back-to-back (e.g., non-consecutive) uplink channels scheduled across multiple time slots. The UE 115 may indicate in its bundling capability information that it is (or is not) capable of maintaining phase continuity across consecutive time slots in a fourth transmission configuration, or that the UE 115 is (or is not) capable of maintaining phase continuity across non-consecutive time slots in a fifth transmission configuration, or both.

In some examples, the UE 115 may provide, as part of the bundling capability information (e.g., UE capability information), a limit for a time gap 505 (e.g., a threshold duration for a time gap 505). For example, in the fourth transmission configuration, the UE 115 may indicate that it is capable of maintaining phase continuity for non-consecutive bundled transmissions 510 across multiple slots (e.g., a bundled transmission 510 in each slot followed by one or more non-bundled transmissions 515 (e.g., uplink or downlink signaling), or a time gap 505-b (e.g., with no scheduled transmission)). In some examples, the UE 115 may further indicate a threshold duration for time gap 505-b (e.g., a maximum amount of time for time gap 505-b). The UE 115 may determine that it is not capable of maintaining phase continuity between a first bundled transmission 510 (e.g., in slot 2) and a second bundled transmission 510 (e.g., in slot 3) if the time gap 505-b exceeds the threshold duration for time gap 505-b. Similarly, the UE 115 may indicate a threshold duration for time gap 505-c in the fifth transmission configuration. For example, time gap 505-c may correspond to an amount of time (e.g., scheduled or unscheduled) between transmitting a first uplink transmission (e.g., in slot 0) and a second uplink transmission (e.g., in slot 2). The UE 115 may determine that it cannot maintain phase continuity between the first and second transmission if time gap 505-c exceeds a threshold duration for time gap 505-c. The threshold duration for a time gap 505 may be indicated, in the bundling capability information, as an absolute time duration (e.g., in ms), as a number of symbols, as a number of slots, or the like.

In some implementations, the fourth transmission configuration and the fifth transmission configuration may include at least two consecutive physical uplink channels that are separated by a time period (e.g., time gap 505-b or time gap 505-c). In the example of the fourth transmission configuration, the time period may be a time duration of less than a slot (e.g., with a scheduled transmission, without a scheduled transmission, or both). In the example of the fifth transmission configuration, the time period may be a time duration greater than or equal to a slot (e.g., with a scheduled transmission, without a scheduled transmission, or both). In some cases, the UE 115 may provide, as part of the bundling capability information, one or more indications for whether the UE 115 is capable of maintaining phase continuity according to the fourth transmission configuration, the fifth transmission configuration, or both.

The UE 115 may indicate, in the bundling capability information, what it can and cannot support (e.g., what can or cannot occur to maintain phase continuity) during a time gap 505 (e.g., between non-consecutive uplink transmissions within or across time slots). For example, the UE 115 may indicate, in the bundling capability information, that it is capable of maintaining phase continuity for a set of physical uplink channels if a time gap 505 (e.g., time gap 505-a in the third transmission configuration, time gap 505-b in the fourth transmission configuration, or time gap 505-c in the fifth transmission configuration) remains unscheduled (e.g., with no scheduled downlink signaling or uplink signaling). In some examples, the UE 115 may indicate that a time gap 505 may be occupied by downlink reception. For example, the UE 115 may indicate that it can maintain phase continuity across a set of uplink channels for non-consecutive bundled transmissions 510 when downlink signaling is scheduled during a time gap 505. In some examples, the UE 115 may indicate a time gap 505 may be a measurement gap where some reference signals are to be measured. Scheduling a measurement gap for time gap 505 may be different from scheduling downlink signaling during a time gap 505 (e.g., because the UE 115 may partially or fully power down a transmit chain to perform measurements). In some examples, the UE 115 may indicate a portion of the time gap 505 that can be allocated for downlink signaling, a portion of the time gap 505 that can be allocated for reference signal measurement (e.g., based on reference signal received in the downlink scheduling in a first portion of the time gap 505), a portion of the time gap 505 that is to remain unscheduled, or any combination thereof (e.g., as described in greater detail with reference to FIG. 7).

The UE may indicate, in the bundling capability information, that a time gap 505 may be occupied by uplink transmissions (e.g., intervening non-bundled transmissions 515 between consecutive bundled transmissions 510). In some examples, the UE 115 may indicate whether it can or cannot maintain phase continuity across a set of uplink channels if one or more intervening uplink transmissions (e.g., non-bundled transmissions 515) are located on a same carrier as the bundled transmissions 510, or on different carriers than the bundled transmissions 510, or both. For instance, the network entity may schedule one or more intervening uplink transmissions on a physical uplink channel on a second carrier that is different than a first carrier on which the set of bundled uplink channels are scheduled. The UE 115 may or may not be able to maintain phase continuity across the set of bundled uplink channels on the first component carrier if the scheduled intervening uplink transmissions are located on the second carrier (e.g., a second carrier that is far enough away in the frequency domain from the first carrier that the UE 115 has to perform transmit chain switching, or has to adjust one or more antenna port configurations, in order to transmit or receive on the second carrier). The UE 115 may indicate this capability in the bundling capability information. In cases where the UE 115 indicates that it can support intervening non-bundled transmissions 515 during time gaps 505, the UE 115 may further indicate whether it can support transmit chain switching. For instance, the UE 115 may indicate whether it can maintain phase continuity across a set of uplink channels when switching between bundled transmissions 510 and non-bundled transmissions 515 scheduled on different component carriers using a same transmit chain for transmission on the different component carriers, as described in greater detail with reference to FIG. 6. Similarly, the UE 115 may indicate whether it can maintain phase continuity across a set of uplink channels when switching between bundled transmissions 510 and non-bundled transmissions 515 scheduled on different component carriers using separate transmit chains for transmission on the different component carriers, as described in greater detail with reference to FIG. 6.

The UE 115 may indicate, in its bundling capability information, one or more parameter values for non-bundled transmissions 515 scheduled during time gaps 505. For example, the UE 115 may indicate that it is capable of maintaining phase continuity across non-consecutive bundled uplink transmissions with intervening non-bundled transmissions 515 if the non-bundled transmissions 515 have the same parameter values as the bundled transmissions 510. For instance, the UE 115 may indicate that non-bundled transmissions 515 and bundled transmissions 510 are to have the same bandwidth, the same transmit power, the same modulation order (e.g., same MCS), the same number of layers, be transmitted with the same antenna ports and transmit precoder matrix indicator (TPMI), or any combination thereof, if the UE 115 is to maintain phase continuity across the set of uplink channels.

In cases where the UE 115 is capable of maintaining phase continuity across a set of uplink channels for non-back-to-back bundled transmissions 510 (e.g., the third transmission configuration, the fourth transmission configuration, the fifth transmission configuration, or the like), the UE 115 may indicate a maximum bundling duration (e.g., a maximum span 405). The maximum bundling duration may be indicated in absolute time, number of symbols, number of slots, an offset value, or the like. The maximum bundling duration may be indicated on a per modulation order (e.g., MCS) basis, on a per sub-carrier spacing basis, a per band basis, or the like.

In some examples, the UE 115 may indicate, in the bundling capability information, that it is capable of maintaining phase continuity across a set of physical uplink channels if a bundling window (e.g., a bundling duration, or a span 405) does not cross a timing boundary (e.g., a frame boundary).

Figure 6:
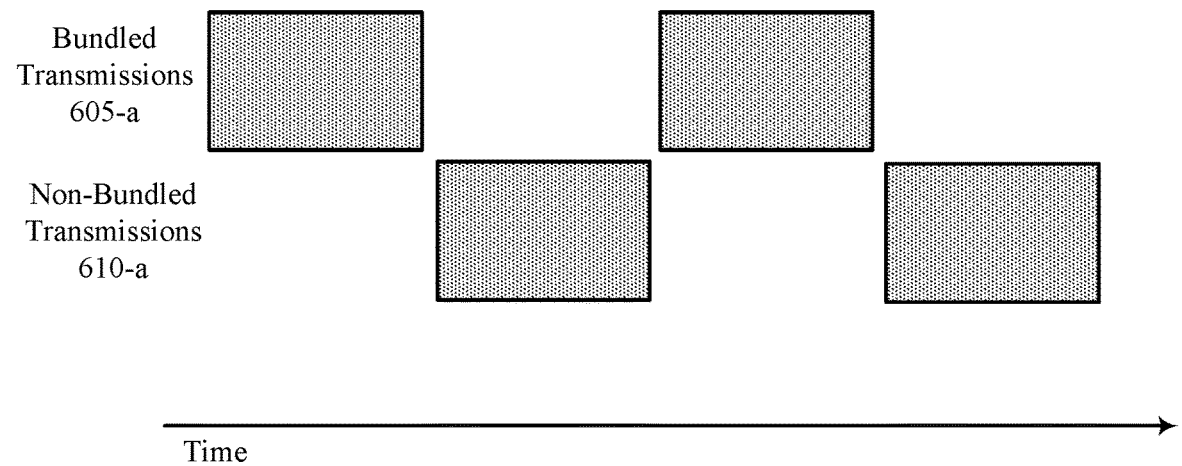
FIG. 6 illustrates an example of a timeline that supports capability signaling for uplink transmissions in accordance with aspects of the present disclosure.
Figure 6:
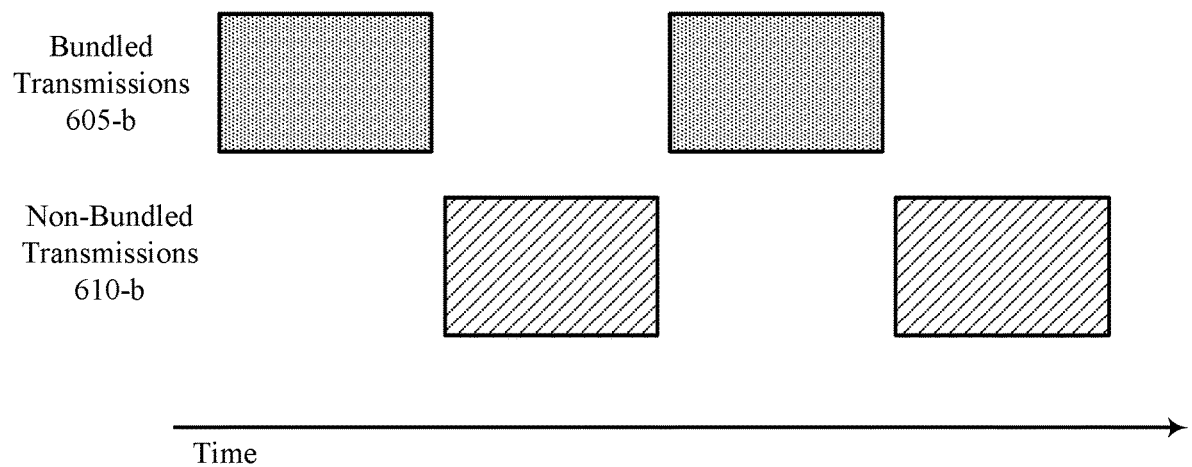
Figure 6:
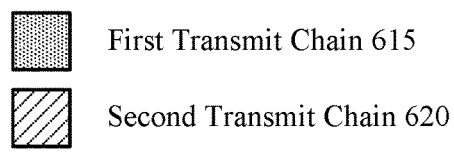

FIG. 6 illustrates an example of a timeline 600 that supports capability signaling for uplink transmissions in accordance with aspects of the present disclosure. Timeline 600 may implement aspects of, or be implemented by, one or more wireless devices, such as a UE 115 and a network entity 105, which may be examples of corresponding devise described with reference to FIGS. 1-5.

In some examples, as described in greater detail with reference to FIG. 5, a UE 115 may be capable of maintaining phase continuity for non-consecutive uplink transmissions within or across time slots. The UE 115 may include in a bundling capability information message, one or more conditions or rules that scheduled uplink transmissions must satisfy in order for the UE 115 to maintain phase continuity across a set of uplink channels. In some examples, the UE may indicate that it is capable of maintaining phase continuity across a set of uplink channels if one or more intervening uplink transmissions are scheduled between bundled uplink transmissions, or if the intervening uplink transmissions satisfy one or more conditions. For instance, the UE 115 may indicate that it is capable of maintaining phase continuity across a set of uplink channels for one or more intervening non-bundled transmissions 610 be scheduled on the same carrier as bundled transmissions. In some examples, the UE 115 may indicate that it is capable of maintaining phase continuity across a set of uplink channels for one or more intervening non-bundled transmissions 610 scheduled on a same carrier or on a different carrier that satisfies a threshold frequency difference value (e.g., a different carrier that is less than a number X of MHz away from the bundled transmissions). In some examples, the UE 115 may indicate that it is capable of maintaining phase continuity across a set of uplink channels for one or more intervening non-bundled transmissions 610 scheduled on a same band as bundled transmissions 605. In such examples, the UE may be able to alternate between bundled transmissions 605-*a* and intervening non-bundled transmissions 610-*a* using the same transmit chain (e.g., first transmit chain 615) while maintaining phase continuity across a set of uplink channels transporting the bundled transmissions 605-*a*. For instance, the UE 115 may transmit a first bundled transmission 605-*a* in a first uplink channel by engaging a first transmit chain 615 for transmission, and may transmit an intervening non-bundled transmission 610-*a* (e.g., in a next slot) by engaging the first transmit chain 615 for transmission, while maintaining phase continuity across the set of uplink channels transporting the bundled transmissions 605-*a*.

In some examples, the UE 115 may include, in the bundling capability information, an indication that it is not capable of maintaining phase continuity across a set of uplink channels for one or more intervening non-bundled transmissions 610 that would require uplink transmit chain switching (e.g., indicating that the UE 115 is not capable of diverting resources from the bundled transmissions 605). For instance, the UE 115 may indicate that it is not capable of maintaining phase continuity over a set of uplink channels for transmission of a first bundled transmission 605-*b* and a second bundled transmission 605-*b* if an intervening non-bundled transmission 610-*b* is to be transmitted using a second transmit chain 620 (while the first transmit chain 615 idles).

In some examples, the UE 115 may indicate that it is capable of maintaining phase continuity over a set of uplink channels even in cases where it switches between first transmit chain 615 and second transmit chain 620 for transmitting bundled transmissions 605-*b* and intervening non-bundled transmissions 610-*b*.

The UE 115 may report, in the bundling capability information, whether it is capable of maintaining phase continuity across the set of bundled physical uplink channels for uplink carrier aggregation (ULCA). The UE 115 may transmit the bundling capability information to the network entity, which may enable simultaneous bundling across two carriers on a physical uplink channel (e.g., a PUSCH or a PUCCH) in an ULCA scenario. In some examples, the UE 115 may indicate, in the capability information, that it is capable of maintaining phase continuity across the set of bundled physical uplink channels during carrier aggregation if bundling windows (e.g., bundling durations or spans 405) are aligned across multiple carriers. This may result in managing uplink transmission power splitting across carriers.

The UE 115 may indicate, in the bundling capability information, a maximum time gap value, or one or more threshold values for portions of time gaps between non-consecutive bundled transmissions 605 over which the UE is capable of maintaining phase continuity across a set of uplink channels, as described in greater detail with reference to FIG. 7.

Figure 7:
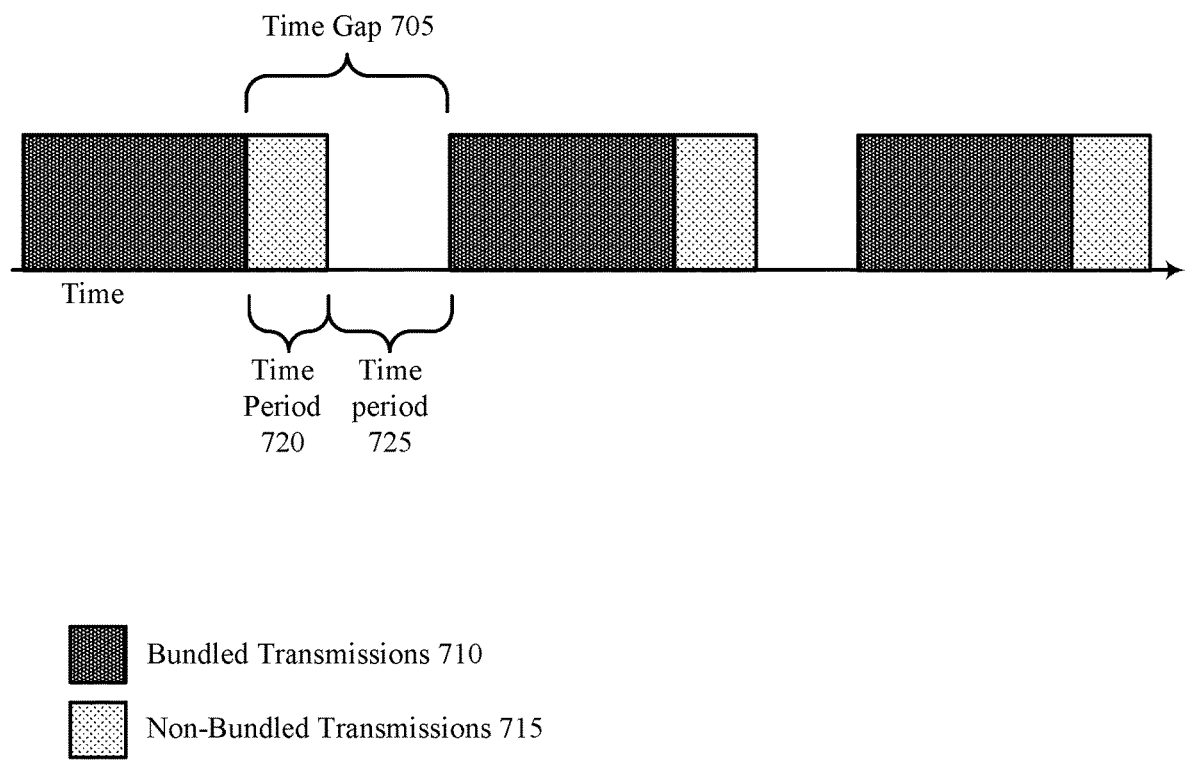
FIG. 7 illustrates an example of a timeline that supports capability signaling for uplink transmissions in accordance with aspects of the present disclosure.

FIG. 7 illustrates an example of a timeline 700 that supports capability signaling for uplink transmissions in accordance with aspects of the present disclosure. Timeline 700 may implement aspects of, or be implemented by, one or more wireless devices, such as a UE 115 and a network entity 105, which may be examples of corresponding devise described with reference to FIGS. 1-6.

As described with reference to FIGS. 2-6, the UE 115 may provide, to the network entity, bundling capability information indicating conditions under which the UE 115 is capable of maintaining phase continuity across a set of uplink channels. In some examples, the capability information may include an indication that the UE is capable of maintaining phase continuity across a set of uplink channels for non-consecutive bundled transmissions 710 (e.g., within a time slot or across multiple time slots) if intervening non-bundled transmissions 715 are scheduled during time gaps 705 between consecutive bundled transmissions 710. In such examples, the UE 115 may further indicate one or more additional constraints on accommodating intervening non-bundled transmissions 715. For instance, the UE may indicate that it is capable of maintaining phase continuity across the set of bundled physical uplink channels if intervening non-bundled transmissions 715 last no longer than time period 720. Time period 720 may be a portion of time gap 705. Time period 720 may be defined as an amount of time (e.g., in milliseconds), a number of symbols, a number of slots, or the like. In some examples, the UE 115 may indicate that it is capable of maintaining phase continuity across the set of bundled physical uplink channels if a time period 725 follows intervening non-bundled transmissions 715. For instance, the UE 115 may indicate that it is capable of maintaining phase continuity across the set of bundled physical uplink channels if an unscheduled gap having a minimum duration (e.g., in time, in a number of symbols or slots, or the like) after each non-bundled transmission 715 ends. Time period 725 may have a duration sufficient for the UE 115 to retune one or more antennas, reconfigure one or more antenna ports, rest a transmit power, transition between transmit chains, or otherwise adjust one or more transmission parameters to maintain phase continuity for bundled transmissions 710 before and after time gap 705.

In some examples, the UE 115 may indicate that it is capable of maintaining phase continuity across a set of uplink channels when receiving downlink signaling (e.g., non-bundled transmissions 715) during time gaps 705, when performing measurements during time gap 705, or both. In some examples, the UE may indicate that it is capable of maintaining phase continuity across the set of physical uplink channels when receiving reference signals during time period 720, and that it is capable of maintaining phase continuity across the set of physical uplink channels when performing reference signal measurements during time period 725. In some examples, the UE 115 may indicate, in the bundling capability information, that it supports downlink signaling during time gaps 705 if the downlink signaling is on a same carrier, in a same band, or on a carrier that satisfies a threshold (e.g., is less than a threshold number of MHz) away from the carrier on which the bundled transmissions 710 are scheduled.

Figure 8:
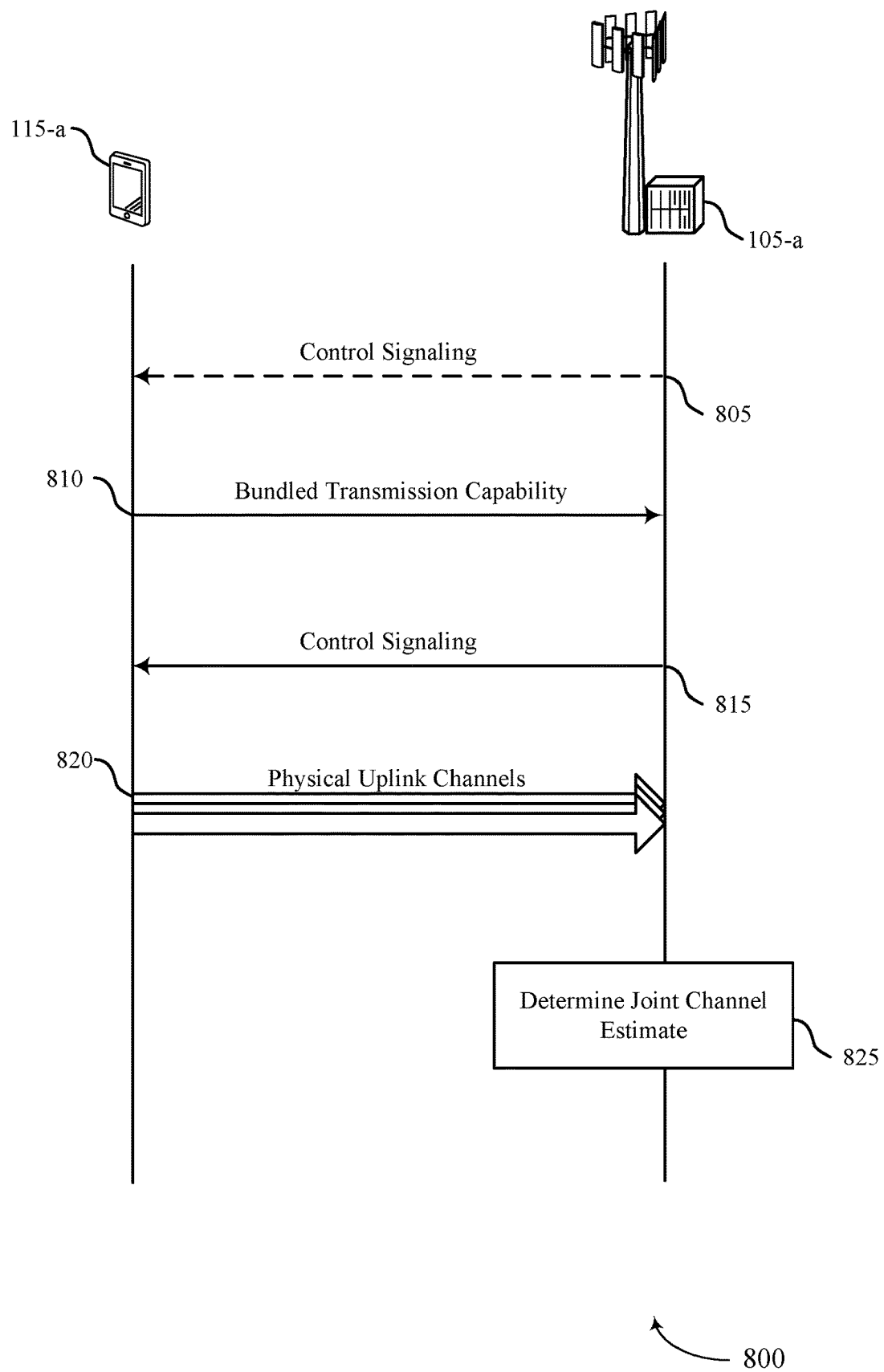
FIG. 8 illustrates an example of a process flow in accordance with aspects of the present disclosure.

FIG. 8 illustrates an example of a process flow 800 that supports capability signaling for uplink transmissions in accordance with aspects of the present disclosure. Process flow 800 may include a UE 115-a, and a network entity 105-a, which may be examples of corresponding devices described with reference to FIGS. 1-7. In the following description of the process flow 800, the operations between the network entity 105-a and the UE 115-a may be transmitted in a different order than the example order shown, or the operations performed by the network entity 105-a and the UE 115-a may be performed in different orders or at different times. Some operations may also be omitted from the process flow 800, and other operations may be added to the process flow 800.

In one implementation, the process flow 800 may illustrate an operation including the UE 115-a transmitting a first control message reporting a bundled transmission capability of the UE 115-a to maintain phase continuity for multiple physical uplink channels (e.g., maintain phase continuity for multiple transmissions across the multiple physical uplink channels), receiving control signaling scheduling the multiple physical uplink channels in accordance with the bundled transmission capability, and transmitting the multiple physical uplink channels having phase continuity and multiple DMRSs corresponding to the multiple physical uplink channels. This implementation may allow for more efficient communications between the UE 115-a and the network entity 105-a, which may result in successfully maintaining phase continuity, successful joint channel estimation, decreased system latency, and efficient utilization of resources, among other benefits.

In some examples, at 805, network entity 105-a may transmit, and UE 115-a may receive, control signaling. The control signaling may include time slot format information (e.g., a slot format indicator (SFI)). The time slot format information may indicate a particular pattern of uplink, downlink, and flexible slots (e.g., U, D, or S) within a set of time slots (e.g., UDDD, UUUU, UDDDU, etc.). A time slot may be a unit of time, such as one or more slots, symbols, mini-slots, sub-slots, subframe, frames, or the like).

At 810, UE 115-a may transmit, and network entity 105-a may receive, a first control message. The first control message may report a bundled transmission capability of UE 115-a to maintain phase continuity for multiple physical uplink channels. In some examples, each of the multiple physical uplink channels (e.g., individual uplink messages scheduled by different DCI messages, or repetitions of a single uplink message) may be consecutive (e.g., within a time slot or across multiple time slots). In some examples, each of the multiple physical uplink channels may be non-consecutive. In such examples, at least two consecutive physical uplink channels (e.g., bundled transmissions) may be separated by a time period (e.g., a time gap 505). In some examples, the first control message may indicate a capability of the UE 115-a to maintain phase continuity for multiple physical uplink channels in accordance with the indicated time slot format information. For example, the time slot format information may indicate that a set of time slots are all back to back uplink time slots or include one or more downlink time slots such that one or more non-back to back uplink time slots occur between consecutive uplink time slots.

In some examples, UE 115-a may transmit the capability information based at least in part on receiving the control signaling at 805. In some examples, each time UE 115-a receives time slot format information from network entity 105-a, UE 115-a may transmit updated capability information corresponding to the indicated time slot format information. For example, the time slot format information may indicate that a time gap (e.g., time gap 505 in FIG. 5) occurs between occasions for consecutive uplink slots or uplink symbol periods over which a set of uplink channels may be scheduled in a same time slot or over a set of multiple time slots. The bundled transmission capability may indicate whether the UE 115-a is capable of maintaining phase continuity for a set of multiple physical uplink channels, where at least two consecutive physical uplink channels of the multiple physical uplink channels are separated by a time period.

The capability information may indicate that UE 115-a is capable of maintaining phase continuity for the physical uplink channels when scheduled within a same time slot. In some examples, the capability information may indicate that UE 115-a is capable of maintaining phase continuity for the physical uplink channels that are scheduled over multiple time slots. In some example, the multiple time slots may be consecutive in time, or may include at least one intervening time slot (e.g., a time gap).

In some examples, the capability information may indicate a frequency band, a sub-carrier spacing, an MCS, or any combination thereof, associated with the reported capability. For example, UE 115-a may transmit capability information on a per band basis for one or more bands, a per sub-carrier spacing basis for one or more sub-carrier spacings, a per MCS order for one or more MCS's (e.g., QPSK may allow for more relaxed requirements than other modulation orders), or any combination thereof. Each bundled capability information message may include an indication of a band, a sub-carrier spacing, an MCS, or any combination thereof, to which the included capability information is to be applied. In some examples, the UE 115-a may report its bundling capability information whenever a TDD slot pattern changes.

The capability information may indicate a threshold number of time slots for the time period (e.g., the time gap) between the at least two consecutive physical uplink channels over which the UE is capable of maintaining phase continuity. The capability information may indicate that the UE 115-a is capable of maintaining phase continuity for the set of physical uplink channels if the network entity 105-a refrains from scheduling uplink transmission, or downlink transmission, or both, for UE 115-a during the time period.

The capability information may indicate that UE 115-a supports scheduling of one or more downlink transmissions, one or more reference signal measurement durations, or any combination thereof, during the time period.

The capability information may indicate that UE 115-a supports scheduling of one or more uplink transmissions during the time period. The capability information may indicate a set of parameter values for transmitting each of the bundled transmissions. The network entity 105-a may include, in the control signaling at 805, a set of parameter values for transmitting each of the physical uplink channels and one or more uplink transmissions. The parameter values may include an indication of a bandwidth, a transmit power, a modulation order, a number of layers, an antenna port, a transmitted precoding matrix indicator, a carrier, a transmit chain switching configuration, or any combination thereof. That is, UE 115-a may indicate, in the capability information, a set of parameter values for transmitting the bundled transmissions, and an indication that the UE 115-a is capable of maintaining phase continuity for the multiple physical uplink channels if the network entity 105-a schedules any intervening non-bundled transmissions with the same parameters.

The capability information may indicate that UE 115-a supports scheduling of one or more intervening non-bundled uplink transmissions during a first portion of the time period (e.g., a first threshold portion), a second portion of the time period (e.g., a second threshold portion) that includes a transmission gap after an intervening scheduled transmission, or any combination thereof. In some examples, the capability information may indicate a maximum duration for the time period between at least two consecutive physical uplink channels over which the UE is capable of maintaining phase continuity. UE 115-a may indicate that UE 115-a supports transmission of the physical uplink channels that are all scheduled within a same frame.

The capability information may indicate that UE 115-a is capable of maintaining phase continuity for the physical uplink channels scheduled across multiple carriers. The capability information may indicate that UE 115-a is capable of maintaining phase continuity for the physical uplink channels scheduled across a first carrier of the multiple carriers during a first transmission window that is aligned in time with a second transmission window of a second carrier of the multiple carriers.

In some examples, the capability information may indicate that UE 115-a is capable of maintaining phase continuity for the physical uplink channels scheduled across multiple transmit chains.

At 815, network entity 105-a may transmit, and UE 115-a may receive, control signaling. The control signaling may schedule the multiple physical uplink channels in accordance with the reported capability.

At 820, UE 115-a may transmit, and network entity 105-a may receive, the multiple physical uplink channels having phase continuity in one or more time slots. UE 115-a may also transmit multiple DMRSs corresponding to the multiple physical uplink channels within the one or more time slots.

At 825, network entity 105-a may receive the one or more DMRSs in the one or more time slots and determine a joint channel estimate for the multiple physical uplink channels based on the received one or more DMRSs. The network entity 105-a may use the joint channel estimate to demodulate the set of physical uplink channels received in the one or more time slots at 820.

Figure 9:
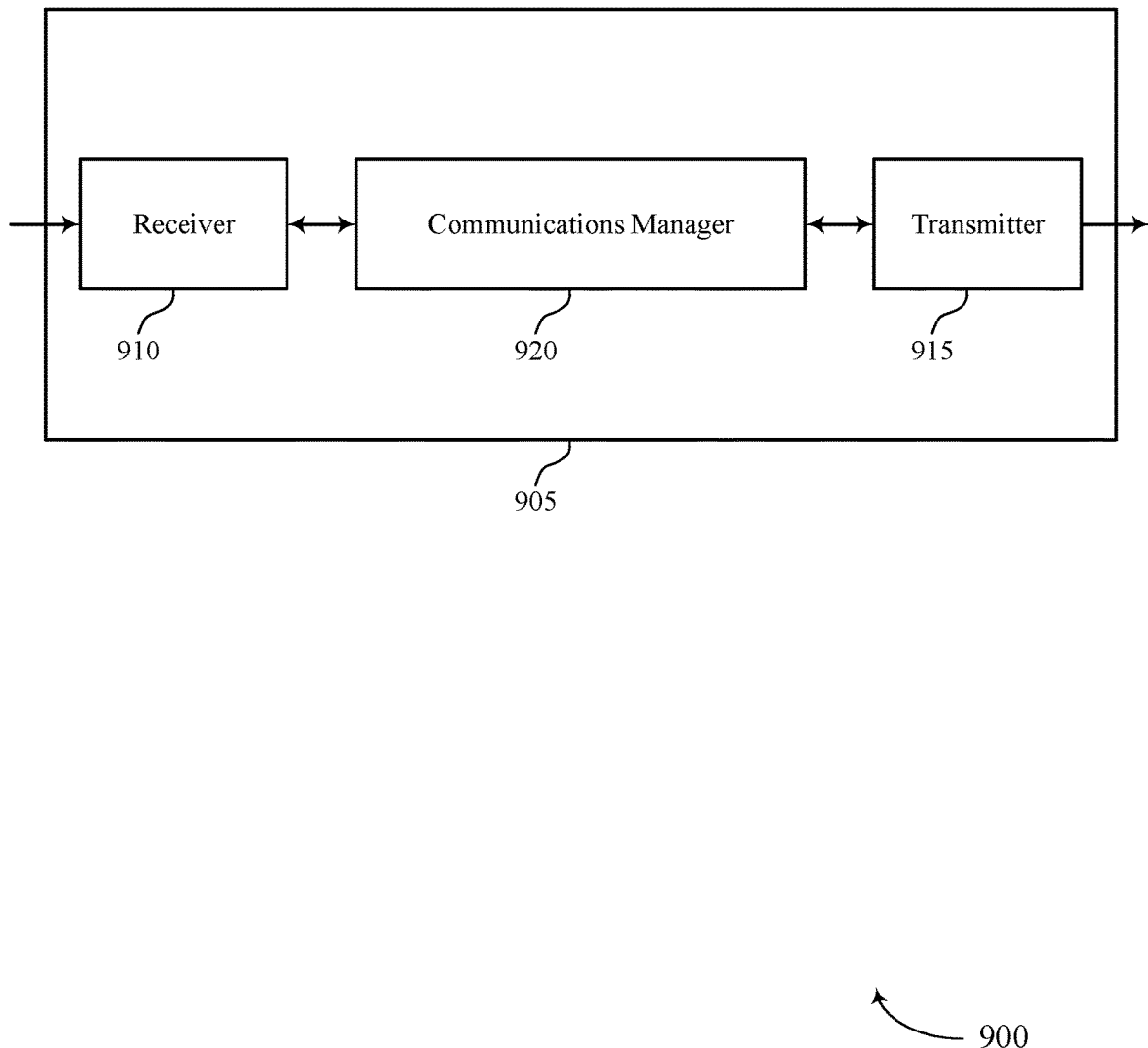
FIGS. 9 and 10 show block diagrams of exemplary devices in accordance with aspects of the present disclosure.

FIG. 9 shows a block diagram 900 of an exemplary device 905 that supports capability signaling for uplink transmissions in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to capability signaling for uplink transmissions). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to capability signaling for uplink transmissions). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of capability signaling for uplink transmissions as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. For example, the communications manager 920 may be configured as or otherwise support a means for transmitting, to a network entity, a first control message reporting a bundled transmission capability of the UE to maintain phase continuity for a set of multiple physical uplink channels, where at least two consecutive physical uplink channels of the set of multiple physical uplink channels are separated by a time period. The communications manager 920 may be configured as or otherwise support a means for receiving, from the network entity based on the first control message, control signaling scheduling the set of multiple physical uplink channels in accordance with the reported capability. The communications manager 920 may be configured as or otherwise support a means for transmitting, based on the control signaling, the set of multiple physical uplink channels having phase continuity and a set of multiple demodulation reference signals corresponding to the set of multiple physical uplink channels.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for signaling bundling capability information, resulting in more efficient use of system resources, more efficient use of computational resources, decreased system latency, and improved user experience.

Figure 10:
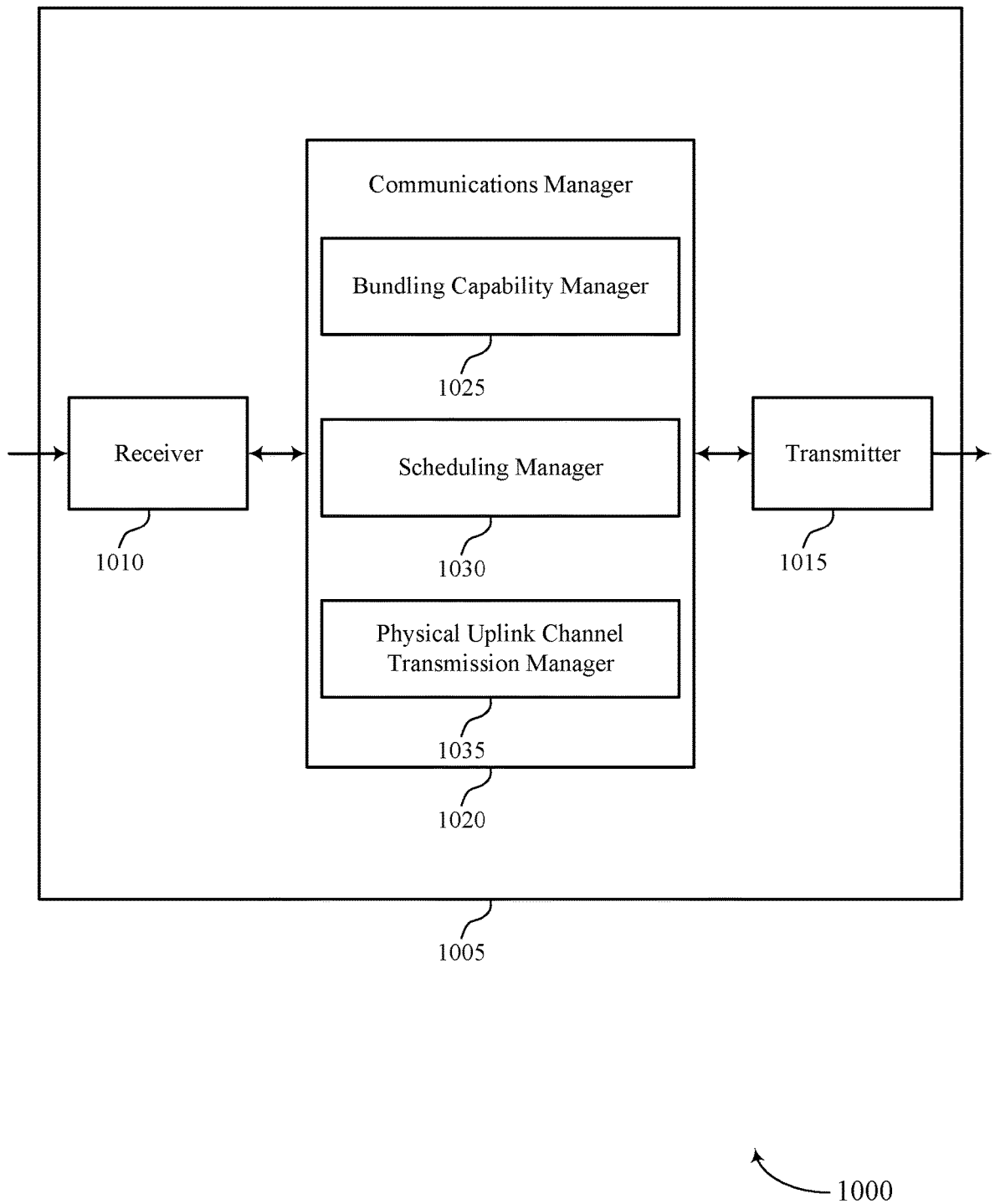

FIG. 10 shows a block diagram 1000 of an exemplary device 1005 that supports capability signaling for uplink transmissions in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to capability signaling for uplink transmissions). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to capability signaling for uplink transmissions). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of capability signaling for uplink transmissions as described herein. For example, the communications manager 1020 may include a bundling capability manager 1025, a scheduling manager 1030, a physical uplink channel transmission manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a UE in accordance with examples as disclosed herein. The bundling capability manager 1025 may be configured as or otherwise support a means for transmitting, to a network entity, a first control message reporting a bundled transmission capability of the UE to maintain phase continuity for a set of multiple physical uplink channels, where at least two consecutive physical uplink channels of the set of multiple physical uplink channels are separated by a time period. The scheduling manager 1030 may be configured as or otherwise support a means for receiving, from the network entity based on the first control message, control signaling scheduling the set of multiple physical uplink channels in accordance with the reported capability. The physical uplink channel transmission manager 1035 may be configured as or otherwise support a means for transmitting, based on the control signaling, the set of multiple physical uplink channels having phase continuity and a set of multiple demodulation reference signals corresponding to the set of multiple physical uplink channels.

Figure 11:
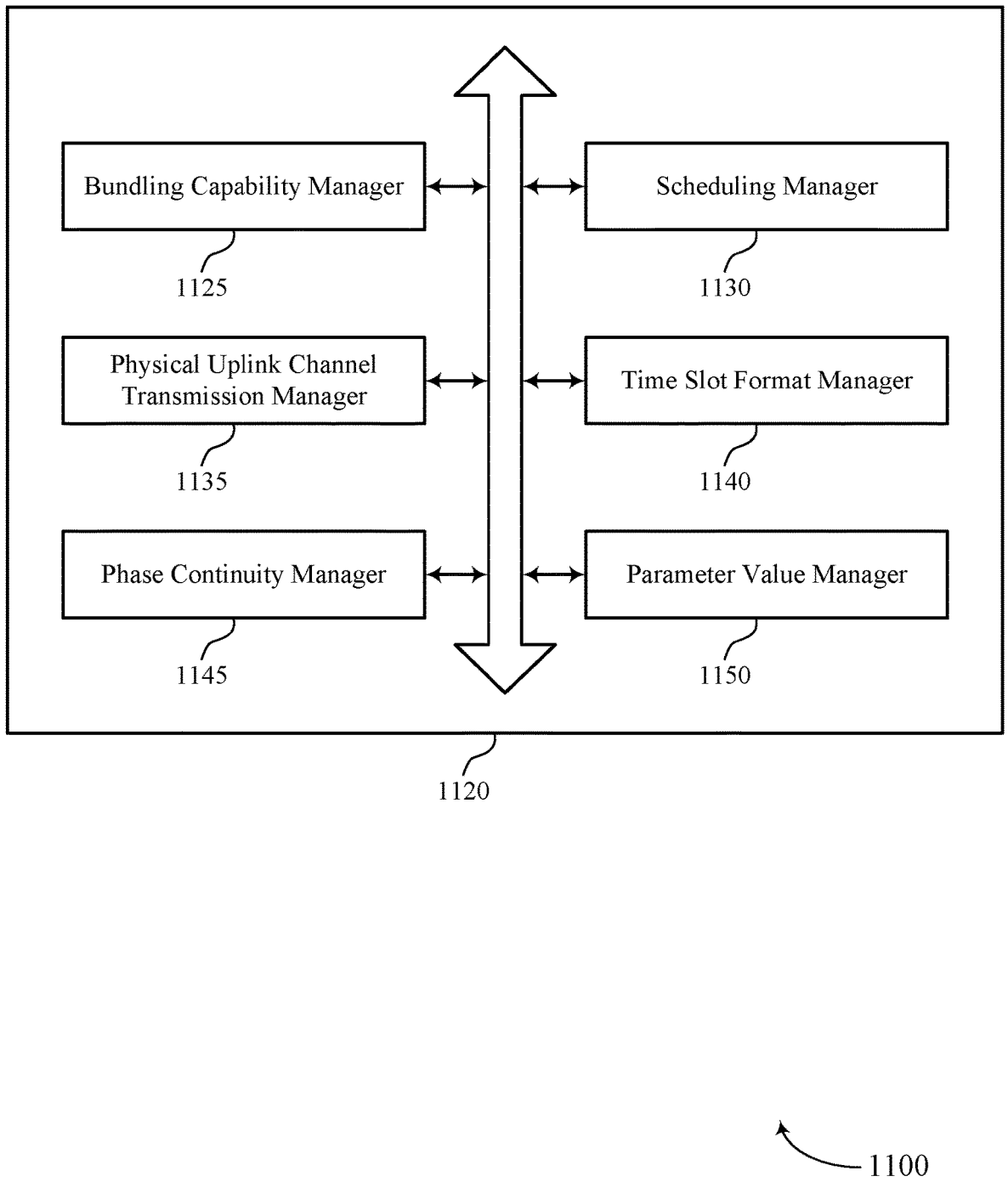
FIG. 11 shows a block diagram of an exemplary communications manager in accordance with aspects of the present disclosure.

FIG. 11 shows a block diagram 1100 of an exemplary communications manager 1120 that supports capability signaling for uplink transmissions in accordance with aspects of the present disclosure. The communications manager 1120 may be an example of aspects of a communications manager 920, a communications manager 1020, or both, as described herein. The communications manager 1120, or various components thereof, may be an example of means for performing various aspects of capability signaling for uplink transmissions as described herein. For example, the communications manager 1120 may include a bundling capability manager 1125, a scheduling manager 1130, a physical uplink channel transmission manager 1135, a time slot format manager 1140, a phase continuity manager 1145, a parameter value manager 1150, or any combination thereof. Each of these components may communicate, directly or indirectly, with one another (e.g., via one or more buses).

The communications manager 1120 may support wireless communications at a UE in accordance with examples as disclosed herein. The bundling capability manager 1125 may be configured as or otherwise support a means for transmitting, to a network entity, a first control message reporting a bundled transmission capability of the UE to maintain phase continuity for a set of multiple physical uplink channels, where at least two consecutive physical uplink channels of the set of multiple physical uplink channels are separated by a time period. The scheduling manager 1130 may be configured as or otherwise support a means for receiving, from the network entity based on the first control message, control signaling scheduling the set of multiple physical uplink channels in accordance with the reported capability. The physical uplink channel transmission manager 1135 may be configured as or otherwise support a means for transmitting, based on the control signaling, the set of multiple physical uplink channels having phase continuity and a set of multiple demodulation reference signals corresponding to the set of multiple physical uplink channels.

In some examples, to support transmitting the first control message, the time slot format manager 1140 may be configured as or otherwise support a means for receiving, from the network entity, a second control message indicating a change to a time slot format, where transmitting the first control message is based on receiving the second control message.

In some examples, to support transmitting the first control message, the phase continuity manager 1145 may be configured as or otherwise support a means for transmitting the first control message indicating that the UE is capable of maintaining phase continuity for the set of multiple physical uplink channels when scheduled within a same time slot.

In some examples, to support transmitting the first control message, the phase continuity manager 1145 may be configured as or otherwise support a means for transmitting the first control message indicating that the UE is capable of maintaining phase continuity for the set of multiple physical uplink channels that are scheduled over a set of multiple time slots.

In some examples, at least a portion of the set of multiple time slots are consecutive in time within the plurality of time slots.

In some examples, to support transmitting the first control message, the bundling capability manager 1125 may be configured as or otherwise support a means for transmitting the first control message indicating a frequency band, a sub-carrier spacing, a modulation and coding scheme, or any combination thereof, associated with the reported capability.

In some examples, to support transmitting the first control message, the bundling capability manager 1125 may be configured as or otherwise support a means for transmitting the first control message indicating a threshold number of time slots for the time period between the at least two consecutive physical uplink channels over which the UE is capable of maintaining phase continuity.

In some examples, to support transmitting the first control message, the bundling capability manager 1125 may be configured as or otherwise support a means for transmitting the first control message requesting that the network entity refrain from scheduling uplink transmission, or downlink transmission, or both, for the UE during the time period.

In some examples, to support transmitting the first control message, the bundling capability manager 1125 may be configured as or otherwise support a means for transmitting the first control message indicating that the UE supports scheduling of one or more downlink transmissions, one or more reference signal measurement durations, or any combination thereof, during the time period.

In some examples, to support transmitting the first control message, the bundling capability manager 1125 may be configured as or otherwise support a means for transmitting the first control message indicating that the UE supports scheduling of one or more uplink transmissions during the time period.

In some examples, to support receiving the control signaling, the parameter value manager 1150 may be configured as or otherwise support a means for receiving the control signaling configuring a same set of parameter values for transmission of each of the set of multiple physical uplink channels and the one or more uplink transmissions.

In some examples, to support same set of parameters, the parameter value manager 1150 may be configured as or otherwise support a means for receiving the control signaling configuring bandwidth, transmit power, modulation order, number of layers, antenna port, transmitted precoding matrix indicator, carrier, transmit chain switching configuration, or any combination thereof.

In some examples, to support transmitting the first control message, the bundling capability manager 1125 may be configured as or otherwise support a means for transmitting the first control message indicating that the UE supports scheduling of one or more intervening uplink transmissions during a first portion of the time period, a second portion of the time period that includes a transmission gap after an intervening scheduled transmission, or any combination thereof.

In some examples, to support transmitting the first control message, the bundling capability manager 1125 may be configured as or otherwise support a means for transmitting the first control message indicating a maximum duration for the time period between at least two consecutive physical uplink channels over which the UE is capable of maintaining phase continuity.

In some examples, to support transmitting the first control message, the bundling capability manager 1125 may be configured as or otherwise support a means for transmitting the first control message indicating that the UE supports transmission of the set of multiple physical uplink channels that are all scheduled within a same frame.

In some examples, to support transmitting the first control message, the phase continuity manager 1145 may be configured as or otherwise support a means for transmitting the first control message indicating that the UE is capable of maintaining phase continuity for a set of multiple physical uplink channels scheduled across a set of multiple carriers in carrier aggregation.

In some examples, to support transmitting the first control message, the phase continuity manager 1145 may be configured as or otherwise support a means for transmitting the first control message indicating that the UE is capable of maintaining phase continuity for a set of multiple physical uplink channels scheduled across a first carrier of the set of multiple carriers during a first transmission window that is aligned in time with a second transmission window of a second carrier of the set of multiple carriers.

In some examples, to support transmitting the first control message, the phase continuity manager 1145 may be configured as or otherwise support a means for transmitting the first control message indicating that the UE is capable of maintaining phase continuity for a set of multiple physical uplink channels scheduled across a set of multiple transmit chains.

In some examples, to support a set of multiple physical uplink channels, the physical uplink channel transmission manager 1135 may be configured as or otherwise support a means for transmitting a set of multiple physical uplink shared channels, a set of multiple physical uplink control channels, or both.

In some examples, to support a set of multiple physical uplink channels, the physical uplink channel transmission manager 1135 may be configured as or otherwise support a means for a set of multiple repetitions of a same physical uplink channel, or two or more different physical uplink channels scheduled by a set of multiple downlink control information messages, or any combination thereof.

Figure 12:
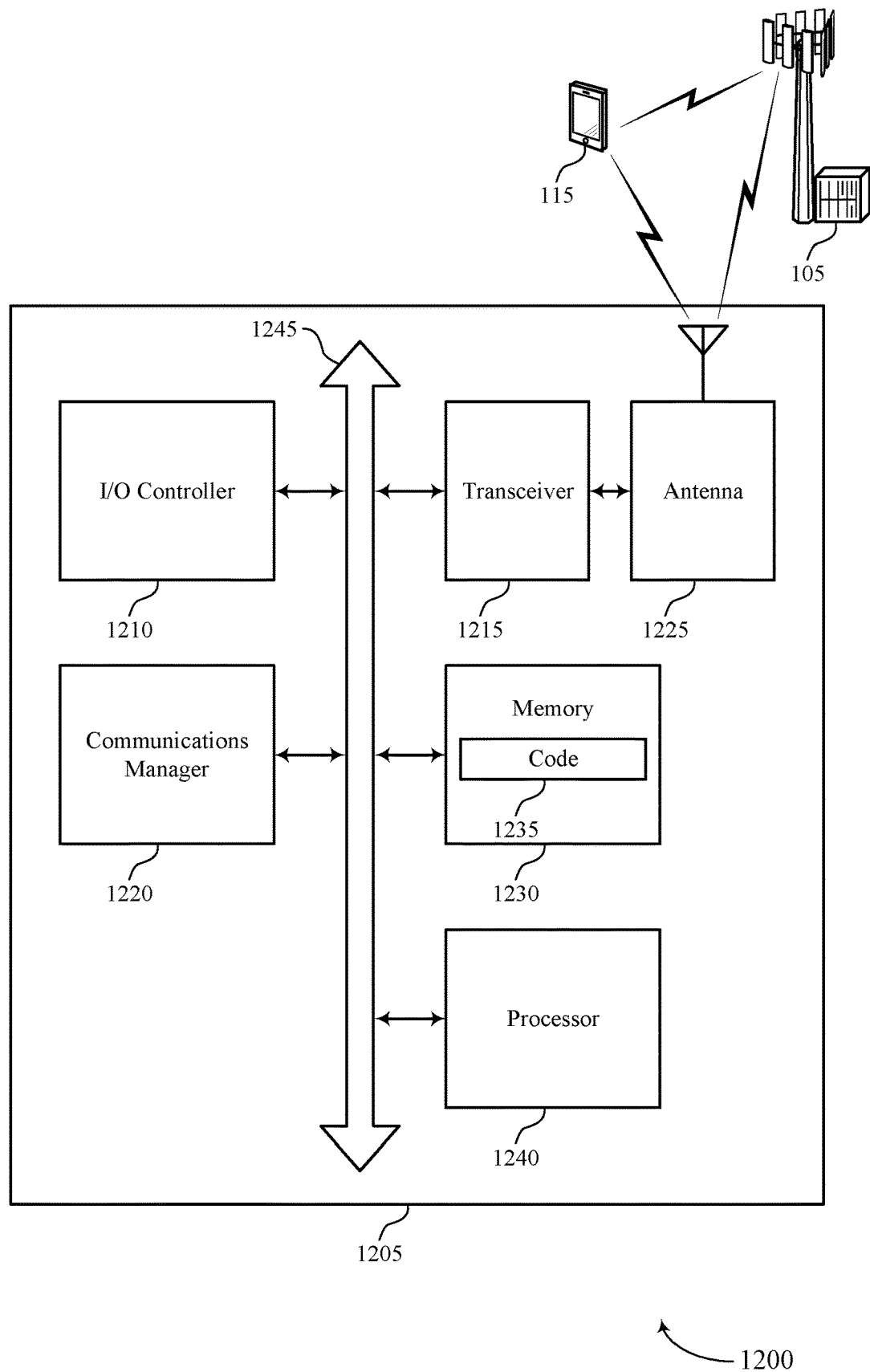
FIG. 12 shows a diagram of an exemplary system including a device in accordance with aspects of the present disclosure.

FIG. 12 shows a diagram of an exemplary system 1200 including a device 1205 that supports capability signaling for uplink transmissions in accordance with aspects of the present disclosure. The device 1205 may be an example of or include the components of a device 905, a device 1005, or a UE 115 as described herein. The device 1205 may communicate wirelessly with one or more network entities 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting capability signaling for uplink transmissions). For example, the device 1205 or a component of the device 1205 may include a processor 1240 and memory 1230 coupled to the processor 1240, the processor 1240 and memory 1230 configured to perform various functions described herein.

The communications manager 1220 may support wireless communications at a UE in accordance with examples as disclosed herein. For example, the communications manager 1220 may be configured as or otherwise support a means for transmitting, to a network entity, a first control message reporting a bundled transmission capability of the UE to maintain phase continuity for a set of multiple physical uplink channels, where at least two consecutive physical uplink channels of the set of multiple physical uplink channels are separated by a time period. The communications manager 1220 may be configured as or otherwise support a means for receiving, from the network entity based on the first control message, control signaling scheduling the set of multiple physical uplink channels in accordance with the reported capability. The communications manager 1220 may be configured as or otherwise support a means for transmitting, based on the control signaling, the set of multiple physical uplink channels having phase continuity and a set of multiple demodulation reference signals corresponding to the set of multiple physical uplink channels.

By including or configuring the communications manager 1220 in accordance with examples as described herein, the device 1205 may support techniques for signaling bundling capability information, resulting in more efficient use of system resources, more efficient use of computational resources, decreased system latency, and improved user experience.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of capability signaling for uplink transmissions as described herein, or the processor 1240 and the memory 1230 may be otherwise configured to perform or support such operations.

Figure 13:
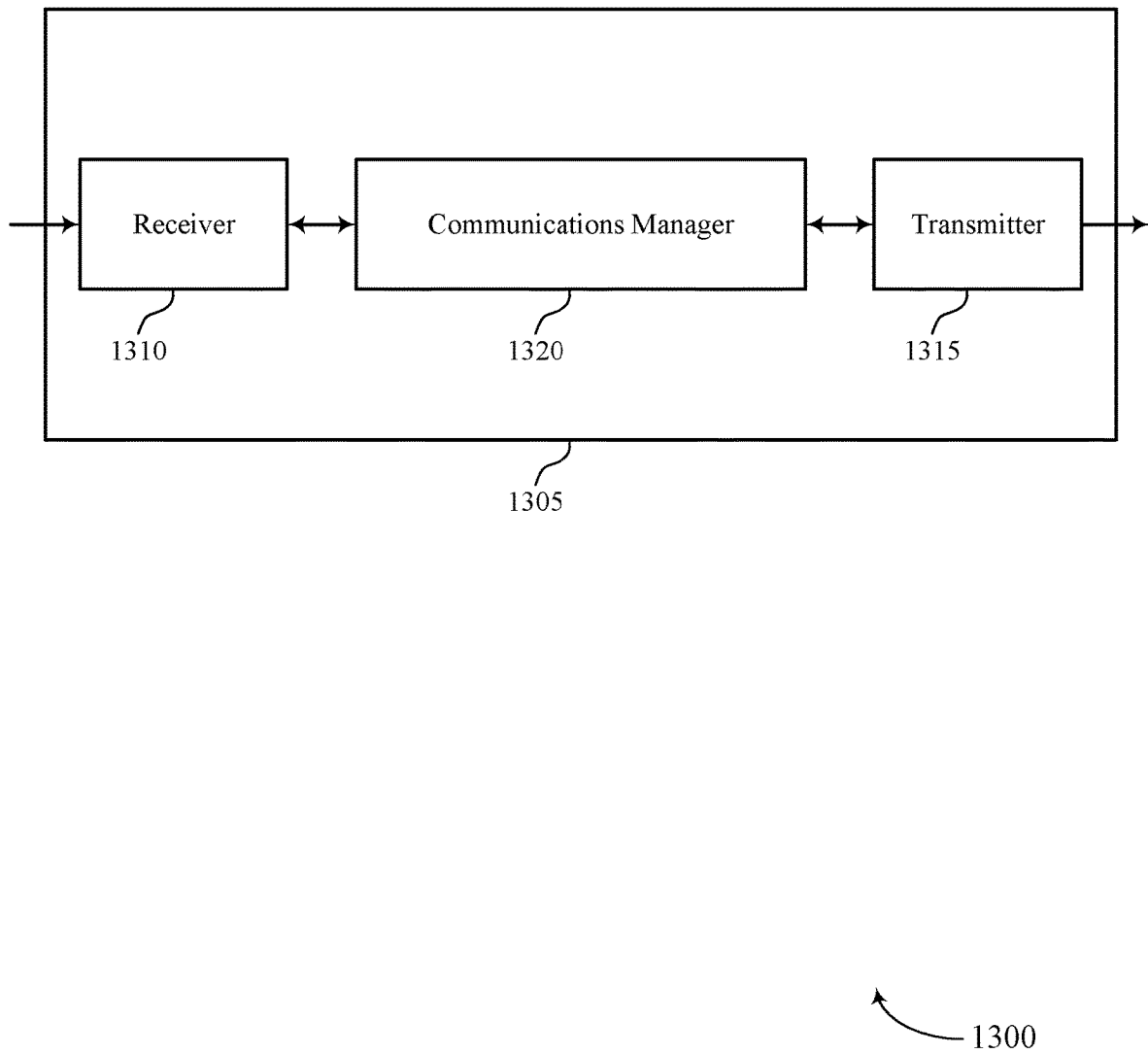
FIGS. 13 and 14 show block diagrams of exemplary devices in accordance with aspects of the present disclosure.

FIG. 13 shows a block diagram 1300 of an exemplary device 1305 that supports capability signaling for uplink transmissions in accordance with aspects of the present disclosure. The device 1305 may be an example of aspects of a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to capability signaling for uplink transmissions). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to capability signaling for uplink transmissions). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of capability signaling for uplink transmissions as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a network entity in accordance with examples as disclosed herein. For example, the communications manager 1320 may be configured as or otherwise support a means for receiving, from a UE, a first control message reporting a bundled transmission capability of the UE to maintain phase continuity for a set of multiple physical uplink channels, where at least two consecutive physical uplink channels of the set of multiple physical uplink channels are separated by a time period. The communications manager 1320 may be configured as or otherwise support a means for transmitting, to the UE based on the first control message, control signaling scheduling the set of multiple physical uplink channels in accordance with the reported capability. The communications manager 1320 may be configured as or otherwise support a means for receiving, based on the control signaling, the set of multiple physical uplink channels having phase continuity and a set of multiple demodulation reference signals corresponding to the set of multiple physical uplink channels.

By including or configuring the communications manager 1320 in accordance with examples as described herein, the device 1305 (e.g., a processor controlling or otherwise coupled to the receiver 1310, the transmitter 1315, the communications manager 1320, or a combination thereof) may support techniques for signaling bundling capability information, resulting in more efficient use of system resources, more efficient use of computational resources, decreased system latency, and improved user experience.

Figure 14:
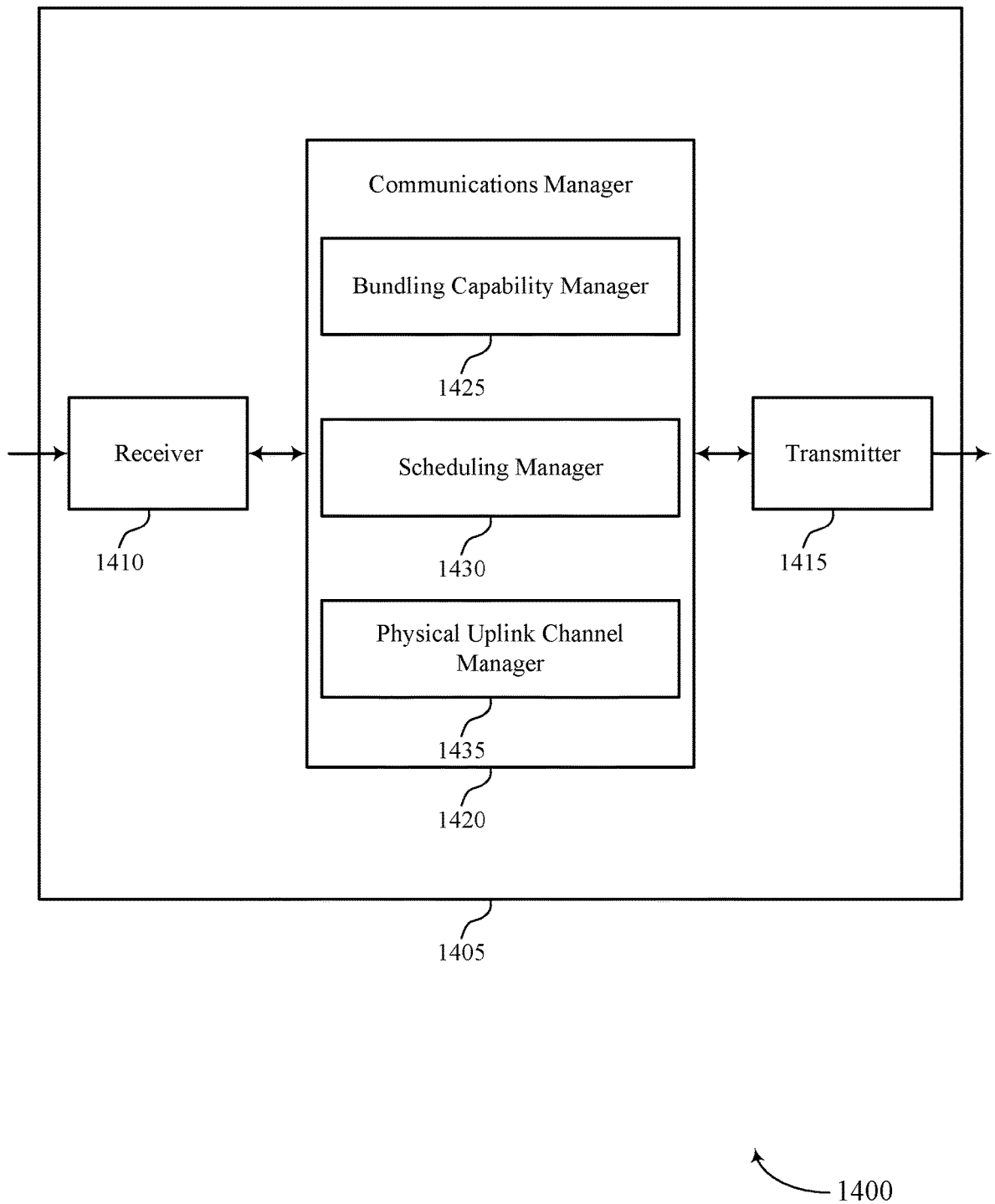

FIG. 14 shows a block diagram 1400 of an exemplary device 1405 that supports capability signaling for uplink transmissions in accordance with aspects of the present disclosure. The device 1405 may be an example of aspects of a device 1305 or a network entity 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to capability signaling for uplink transmissions). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to capability signaling for uplink transmissions). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of capability signaling for uplink transmissions as described herein. For example, the communications manager 1420 may include a bundling capability manager 1425, a scheduling manager 1430, a physical uplink channel manager 1435, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communications at a network entity in accordance with examples as disclosed herein. The bundling capability manager 1425 may be configured as or otherwise support a means for receiving, from a UE, a first control message reporting a bundled transmission capability of the UE to maintain phase continuity for a set of multiple physical uplink channels, where at least two consecutive physical uplink channels of the set of multiple physical uplink channels are separated by a time period. The scheduling manager 1430 may be configured as or otherwise support a means for transmitting, to the UE based on the first control message, control signaling scheduling the set of multiple physical uplink channels in accordance with the reported capability. The physical uplink channel manager 1435 may be configured as or otherwise support a means for receiving, based on the control signaling, the set of multiple physical uplink channels having phase continuity and a set of multiple demodulation reference signals corresponding to the set of multiple physical uplink channels.

Figure 15:
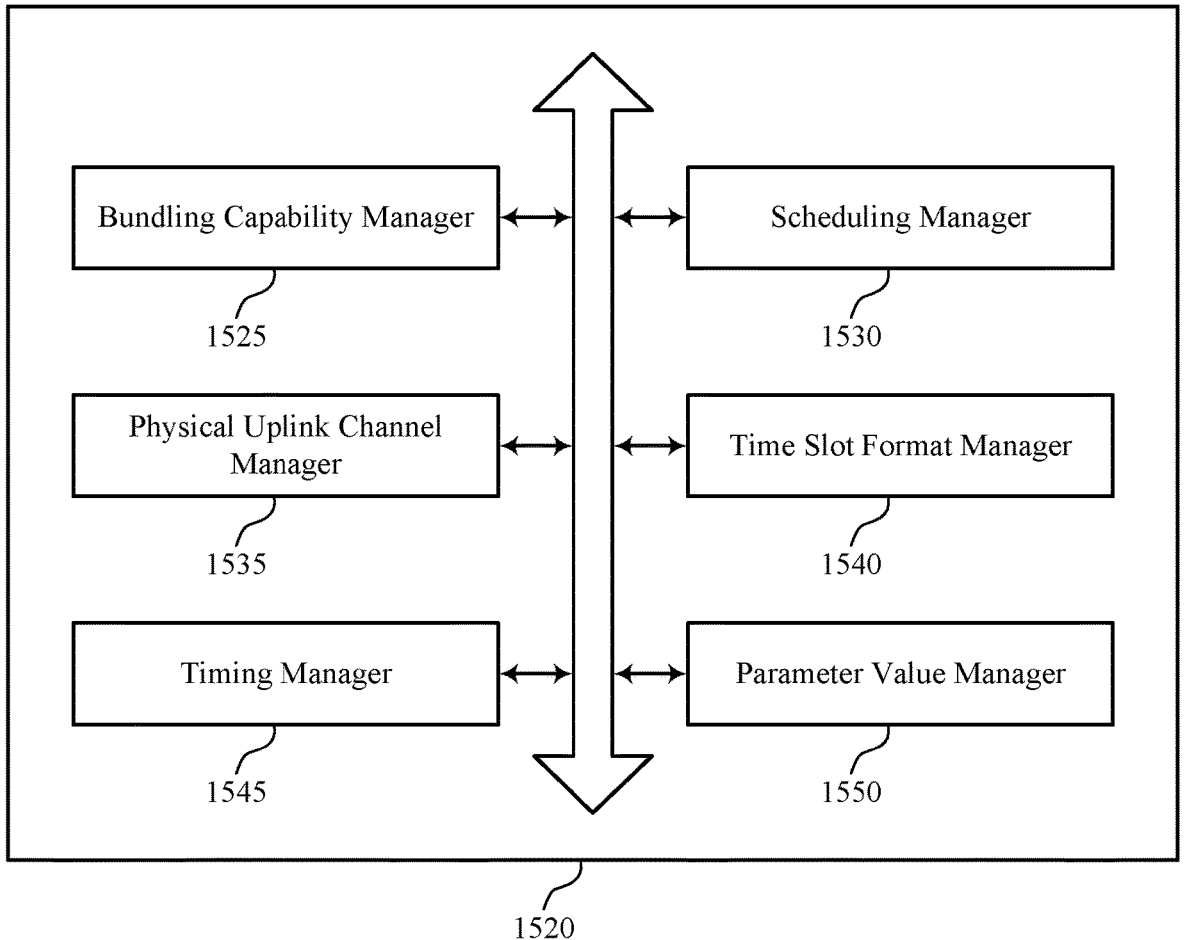
FIG. 15 shows a block diagram of an exemplary communications manager in accordance with aspects of the present disclosure.

FIG. 15 shows a block diagram 1500 of an exemplary communications manager 1520 that supports capability signaling for uplink transmissions in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of capability signaling for uplink transmissions as described herein. For example, the communications manager 1520 may include a bundling capability manager 1525, a scheduling manager 1530, a physical uplink channel manager 1535, a time slot format manager 1540, a timing manager 1545, a parameter value manager 1550, or any combination thereof. Each of these components may communicate, directly or indirectly, with one another (e.g., via one or more buses).

The communications manager 1520 may support wireless communications at a network entity in accordance with examples as disclosed herein. The bundling capability manager 1525 may be configured as or otherwise support a means for receiving, from a UE, a first control message reporting a bundled transmission capability of the UE to maintain phase continuity for a set of multiple physical uplink channels, where at least two consecutive physical uplink channels of the set of multiple physical uplink channels are separated by a time period. The scheduling manager 1530 may be configured as or otherwise support a means for transmitting, to the UE based on the first control message, control signaling scheduling the set of multiple physical uplink channels in accordance with the reported capability. The physical uplink channel manager 1535 may be configured as or otherwise support a means for receiving, based on the control signaling, the set of multiple physical uplink channels having phase continuity and a set of multiple demodulation reference signals corresponding to the set of multiple physical uplink channels.

In some examples, to support receiving the first control message, the time slot format manager 1540 may be configured as or otherwise support a means for transmitting, to the UE, a second control message indicating a change to a time slot format, where receiving the first control message is based on transmitting the second control message.

In some examples, to support receiving the first control message, the bundling capability manager 1525 may be configured as or otherwise support a means for receiving the first control message indicating that the UE is capable of maintaining phase continuity for the set of multiple physical uplink channels when scheduled within a same time slot.

In some examples, to support receiving the first control message, the bundling capability manager 1525 may be configured as or otherwise support a means for receiving the first control message indicating that the UE is capable of maintaining phase continuity for the set of multiple physical uplink channels that are scheduled over a set of multiple time slots.

In some examples, at least a portion of the set of multiple time slots are consecutive in time within the plurality of time slots.

In some examples, to support receiving the first control message, the bundling capability manager 1525 may be configured as or otherwise support a means for receiving the first control message indicating a frequency band, a subcarrier spacing, a modulation and coding scheme, or any combination thereof, associated with the reported capability.

In some examples, to support receiving the first control message, the bundling capability manager 1525 may be configured as or otherwise support a means for receiving the first control message indicating a threshold number of time slots for the time period between the at least two consecutive physical uplink channels over which the UE is capable of maintaining phase continuity.

In some examples, to support receiving the first control message, the bundling capability manager 1525 may be configured as or otherwise support a means for receiving the first control message requesting that the network entity refrain from scheduling uplink transmission, or downlink transmission, or both, for the UE during the time period.

In some examples, to support receiving the first control message, the bundling capability manager 1525 may be configured as or otherwise support a means for receiving the first control message indicating that the UE supports scheduling of one or more downlink transmissions, one or more reference signal measurement durations, or any combination thereof, during the time period between the at least two consecutive physical uplink channels.

In some examples, to support receiving the first control message, the bundling capability manager 1525 may be configured as or otherwise support a means for receiving the first control message indicating that the UE supports scheduling of one or more uplink transmissions during the time period.

In some examples, to support transmitting the control signaling, the parameter value manager 1550 may be configured as or otherwise support a means for transmitting the control signaling configuring a same set of parameter values for transmission of each of the set of multiple physical uplink channels and the one or more uplink transmissions.

In some examples, to support same set of parameters, the parameter value manager 1550 may be configured as or otherwise support a means for transmitting the control signaling configuring bandwidth, transmit power, modulation order, number of layers, antenna port, TPMI, carrier, transmit chain switching configuration, or any combination thereof.

In some examples, to support receiving the first control message, the scheduling manager 1530 may be configured as or otherwise support a means for receiving the first control message indicating that the UE supports scheduling of one or more intervening uplink transmissions during a first portion of the time period, a second portion of the time period that includes a transmission gap after an intervening scheduled transmission, or any combination thereof.

In some examples, to support receiving the first control message, the timing manager 1545 may be configured as or otherwise support a means for receiving the first control message indicating a maximum duration for the time period between at least two consecutive physical uplink channels over which the UE is capable of maintaining phase continuity.

In some examples, to support receiving the first control message, the timing manager 1545 may be configured as or otherwise support a means for receiving the first control message indicating that the UE supports transmission of the set of multiple physical uplink channels that are all scheduled within a same frame.

In some examples, to support receiving the first control message, the bundling capability manager 1525 may be configured as or otherwise support a means for receiving the first control message indicating that the UE is capable of maintaining phase continuity for a set of multiple physical uplink channels scheduled across a first carrier of the set of multiple carriers during a first transmission window that is aligned in time with a second transmission window of a second carrier of the set of multiple carriers.

In some examples, to support receiving the first control message, the bundling capability manager 1525 may be configured as or otherwise support a means for receiving the first control message indicating that the UE is capable of maintaining phase continuity for a set of multiple physical uplink channels scheduled across a first carrier of the set of multiple carriers during a first transmission window that is aligned in time with a second transmission window of a second carrier of the set of multiple carriers.

In some examples, to support receiving the first control message, the bundling capability manager 1525 may be configured as or otherwise support a means for receiving the first control message indicating that the UE is capable of maintaining phase continuity for a set of multiple physical uplink channels scheduled across a set of multiple transmit chains.

In some examples, to support a set of multiple physical uplink channels, the physical uplink channel manager 1535 may be configured as or otherwise support a means for receiving a set of multiple physical uplink shared channels, a set of multiple physical uplink control channels, or both.

In some examples, to support a set of multiple physical uplink channels, the physical uplink channel manager 1535 may be configured as or otherwise support a means for receiving a set of multiple repetitions of a same physical uplink channel, or two or more different physical uplink channels scheduled by a set of multiple downlink control information messages, or any combination thereof.

Figure 16:
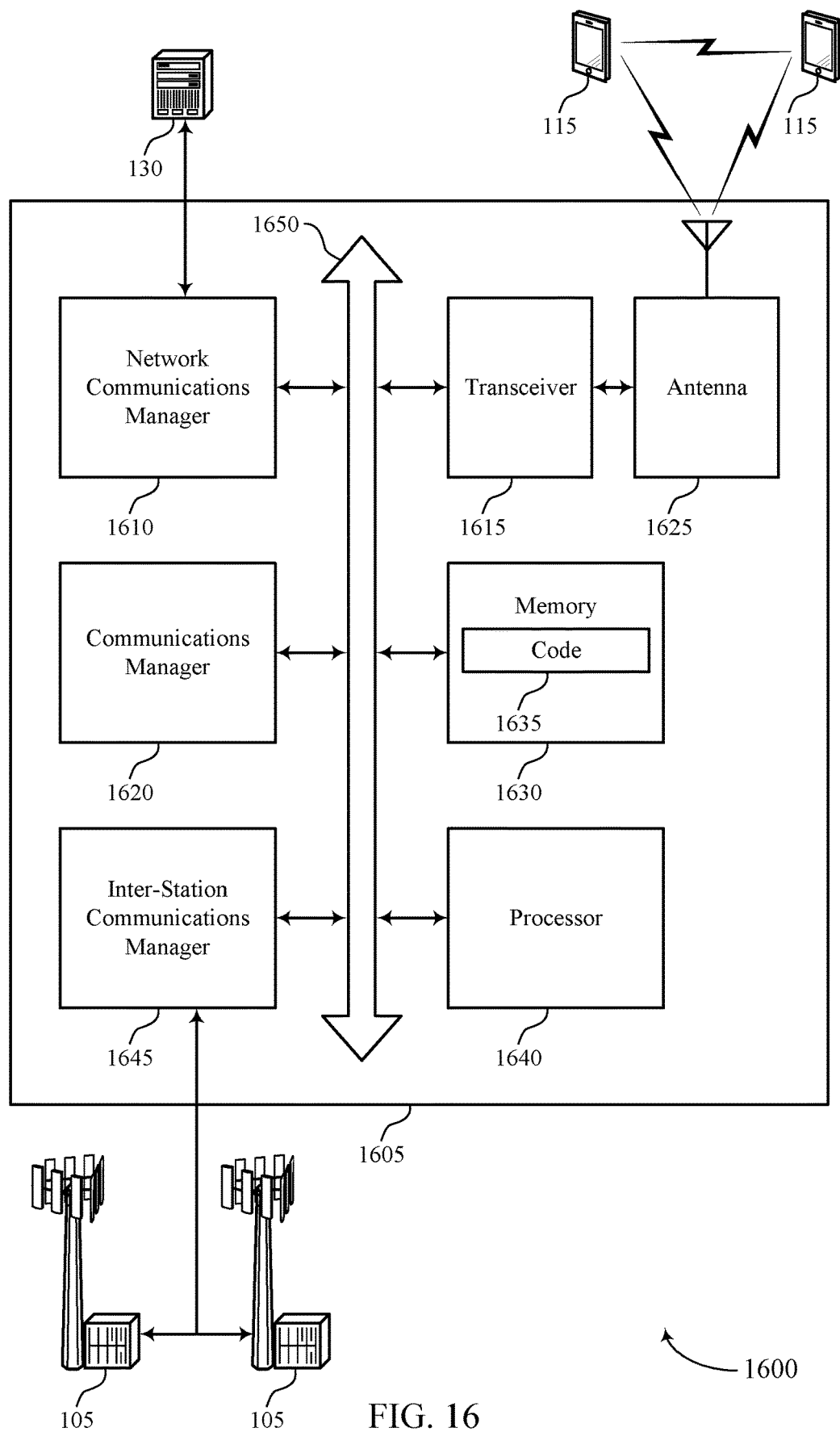
FIG. 16 shows a diagram of an exemplary system including a device in accordance with aspects of the present disclosure.

FIG. 16 shows a diagram of an exemplary system 1600 including a device 1605 that supports capability signaling for uplink transmissions in accordance with aspects of the present disclosure. The device 1605 may be an example of or include the components of a device 1305, a device 1405, or a network entity 105 as described herein. The device 1605 may communicate wirelessly with one or more network entities 105, UEs 115, or any combination thereof. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting capability signaling for uplink transmissions). For example, the device 1605 or a component of the device 1605 may include a processor 1640 and memory 1630 coupled to the processor 1640, the processor 1640 and memory 1630 configured to perform various functions described herein.

The inter-station communications manager 1645 may manage communications with other network entities 105, and may include a controller or scheduler for controlling communications with UEs 115 in cooperation with other network entities 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between network entities 105.

The communications manager 1620 may support wireless communications at a network entity in accordance with examples as disclosed herein. For example, the communications manager 1620 may be configured as or otherwise support a means for receiving, from a UE, a first control message reporting a bundled transmission capability of the UE to maintain phase continuity for a set of multiple physical uplink channels, where at least two consecutive physical uplink channels of the set of multiple physical uplink channels are separated by a time period. The communications manager 1620 may be configured as or otherwise support a means for transmitting, to the UE based on the first control message, control signaling scheduling the set of multiple physical uplink channels in accordance with the reported capability. The communications manager 1620 may be configured as or otherwise support a means for receiving, based on the control signaling, the set of multiple physical uplink channels having phase continuity and a set of multiple demodulation reference signals corresponding to the set of multiple physical uplink channels.

By including or configuring the communications manager 1620 in accordance with examples as described herein, the device 1605 may support techniques for signaling bundling capability information, resulting in more efficient use of system resources, more efficient use of computational resources, decreased system latency, and improved user experience.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of capability signaling for uplink transmissions as described herein, or the processor 1640 and the memory 1630 may be otherwise configured to perform or support such operations.

Figure 17:
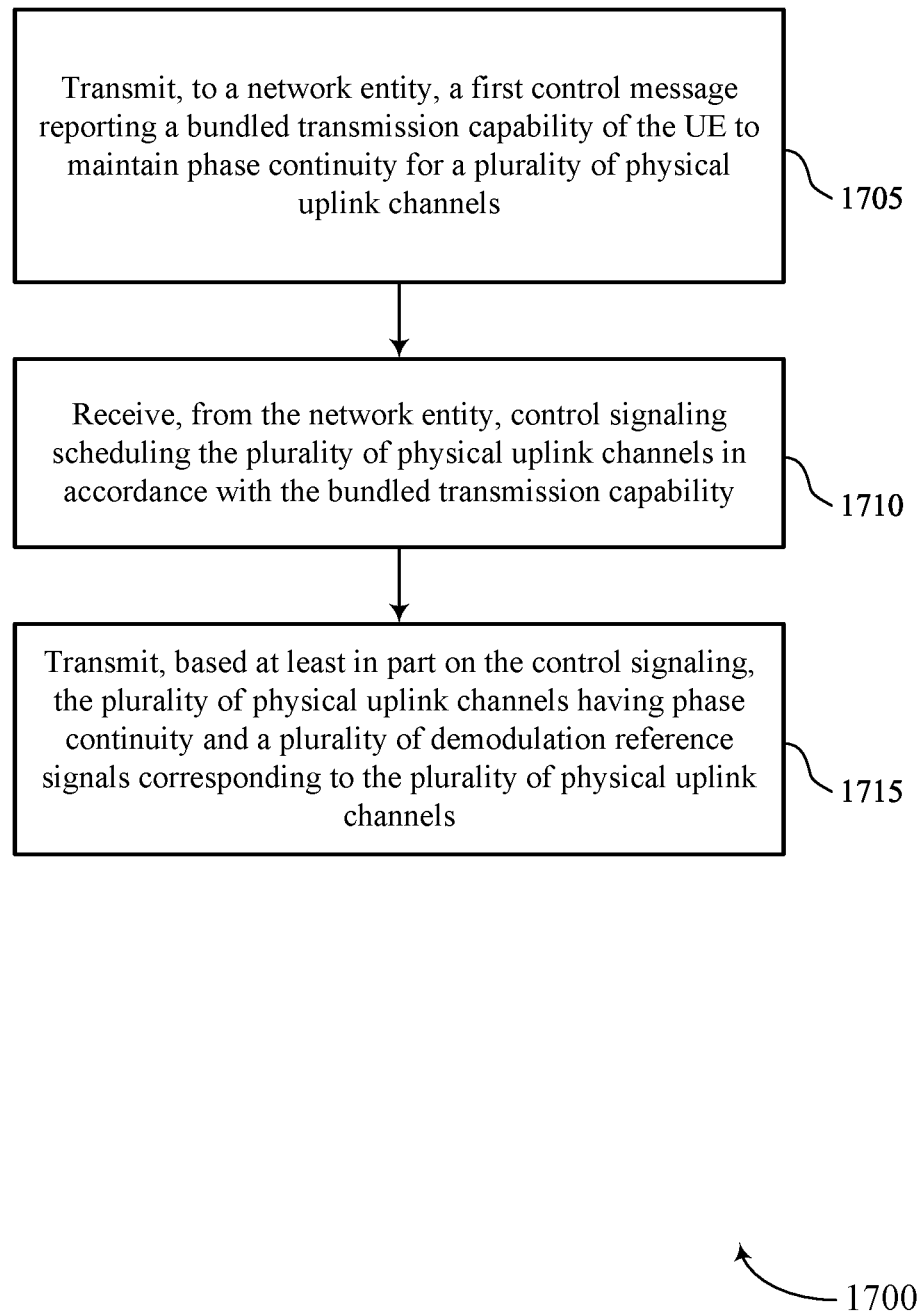
FIGS. 17 through 20 show flowcharts illustrating exemplary methods that support capability signaling for uplink transmissions in accordance with aspects of the present disclosure.

FIG. 17 shows a flowchart illustrating an exemplary method 1700 that supports capability signaling for uplink transmissions in accordance with aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include transmitting, to a network entity, a first control message reporting a bundled transmission capability of the UE to maintain phase continuity for a set of multiple physical uplink channels. The operations of 1705 may be performed in accordance with examples as disclosed herein. In some examples, aspects of the operations of 1705 may be performed by a bundling capability manager 1125 as described with reference to FIG. 11.

At 1710, the method may include receiving, from the network entity based on the first control message, control signaling scheduling the set of multiple physical uplink channels in accordance with the bundled transmission capability. The operations of 1710 may be performed in accordance with examples as disclosed herein. In some examples, aspects of the operations of 1710 may be performed by a scheduling manager 1130 as described with reference to FIG. 11.

At 1715, the method may include transmitting, based on the control signaling, the set of multiple physical uplink channels having phase continuity and a set of multiple demodulation reference signals corresponding to the set of multiple physical uplink channels. The operations of 1715 may be performed in accordance with examples as disclosed herein. In some examples, aspects of the operations of 1715 may be performed by a physical uplink channel transmission manager 1135 as described with reference to FIG. 11.

Figure 18:
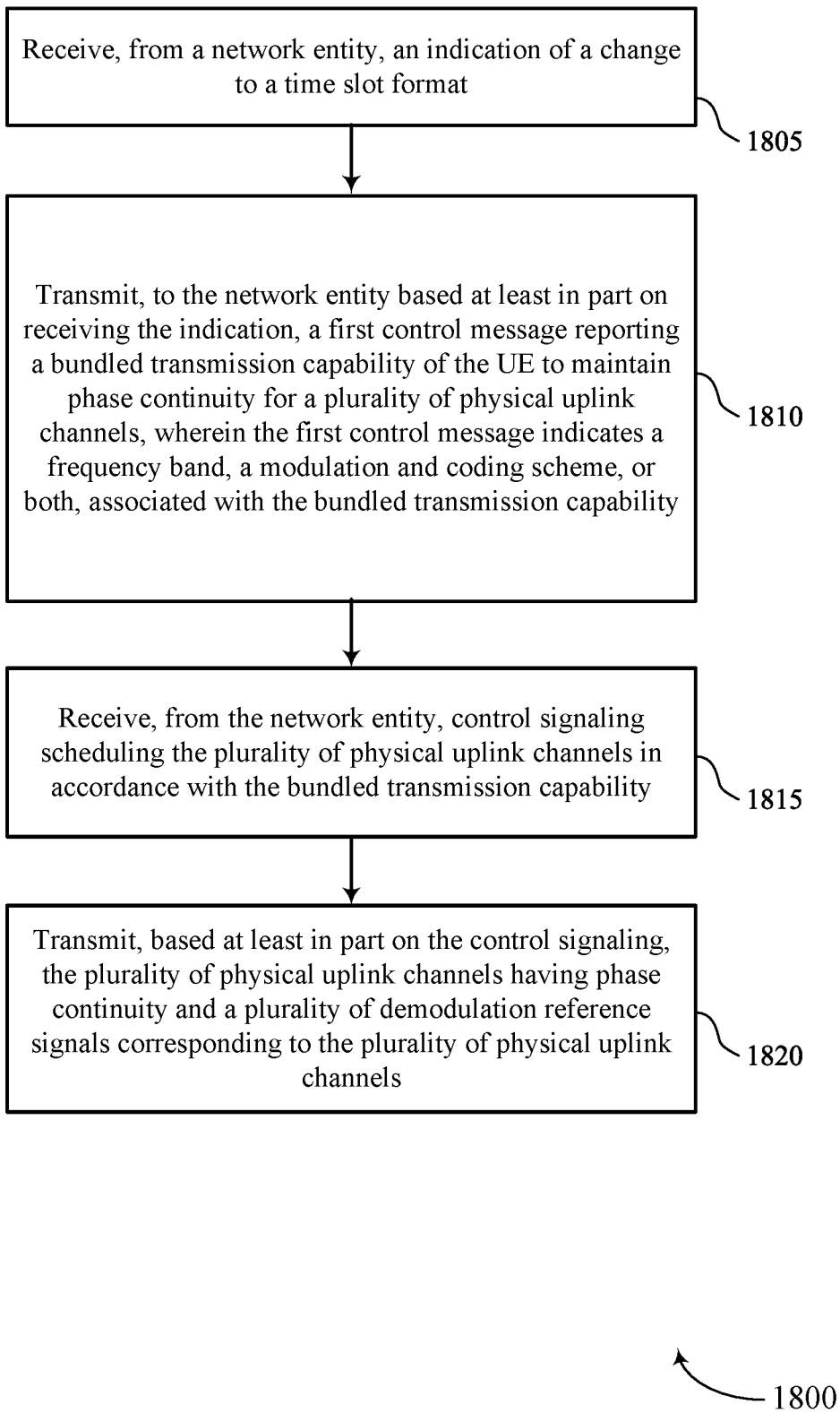

FIG. 18 shows a flowchart illustrating an exemplary method 1800 that supports capability signaling for uplink transmissions in accordance with aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1805, the method may include receiving, from a network entity, an indication of a change to a time slot format. The operations of 1805 may be performed in accordance with examples as disclosed herein. In some examples, aspects of the operations of 1805 may be performed by a time slot format manager 1140 as described with reference to FIG. 11.

At 1810, the method may include transmitting, to a network entity based at least in part on receiving the indication, a first control message reporting a bundled transmission capability of the UE to maintain phase continuity for a set of multiple physical uplink channels, wherein the first control message indicates a frequency band, a subcarrier spacing, a modulation and coding scheme, or any combination thereof, associated with the bundled transmission capability. The operations of 1810 may be performed in accordance with examples as disclosed herein. In some examples, aspects of the operations of 1810 may be performed by a bundling capability manager 1125 as described with reference to FIG. 11.

At 1815, the method may include receiving, from the network entity based on the first control message, control signaling scheduling the set of multiple physical uplink channels in accordance with the bundled transmission capability. The operations of 1815 may be performed in accordance with examples as disclosed herein. In some examples, aspects of the operations of 1815 may be performed by a scheduling manager 1130 as described with reference to FIG. 11.

At 1820, the method may include transmitting, based on the control signaling, the set of multiple physical uplink channels having phase continuity and a set of multiple demodulation reference signals corresponding to the set of multiple physical uplink channels. The operations of 1820 may be performed in accordance with examples as disclosed herein. In some examples, aspects of the operations of 1820 may be performed by a physical uplink channel transmission manager 1135 as described with reference to FIG. 11.

Figure 19:
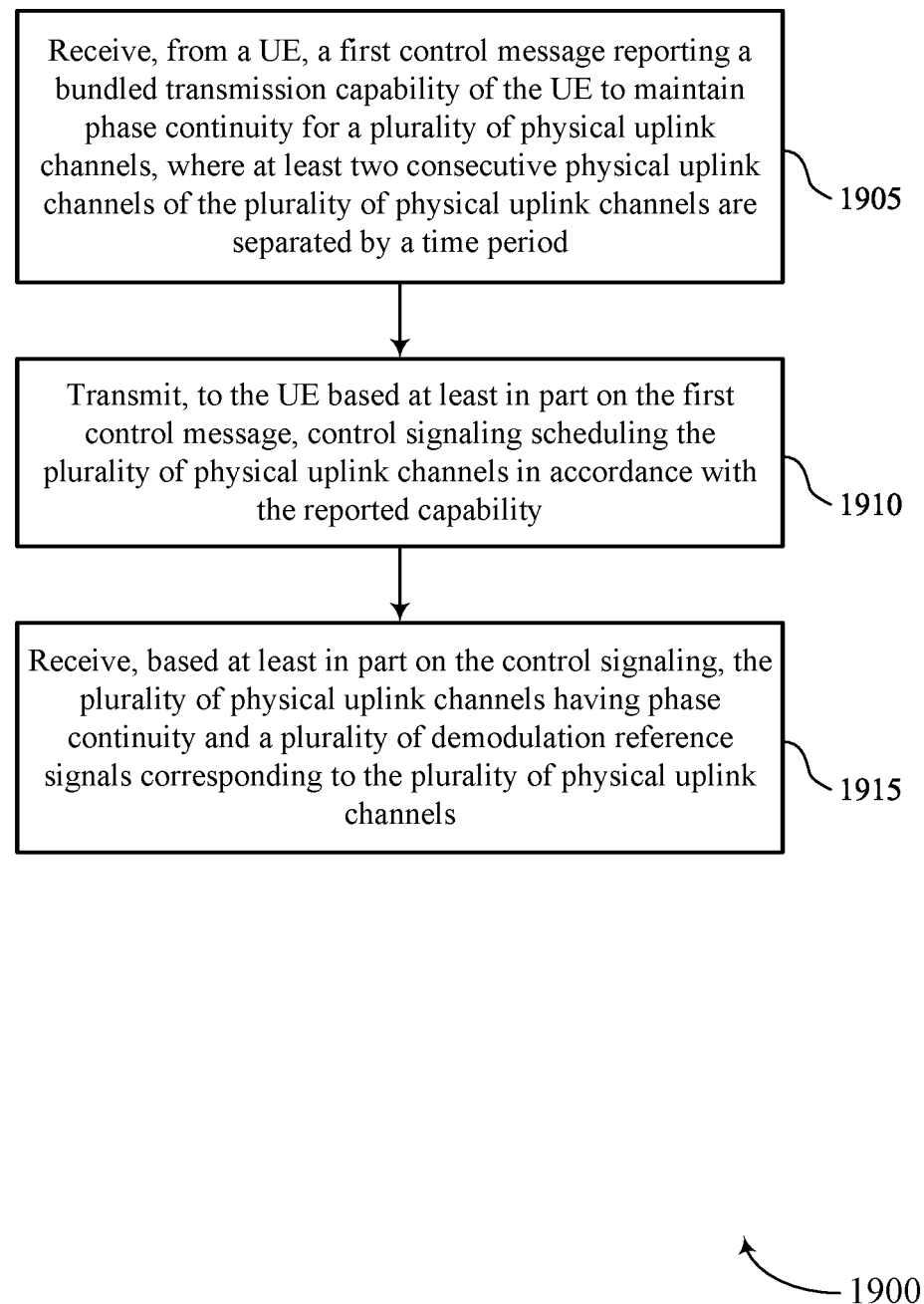

FIG. 19 shows a flowchart illustrating an exemplary method 1900 that supports capability signaling for uplink transmissions in accordance with aspects of the present disclosure. The operations of the method 1900 may be implemented by a network entity or its components as described herein. For example, the operations of the method 1900 may be performed by a network entity 105 as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 1905, the method may include receiving, from a UE, a first control message reporting a bundled transmission capability of the UE to maintain phase continuity for a set of multiple physical uplink channels. The operations of 1905 may be performed in accordance with examples as disclosed herein. In some examples, aspects of the operations of 1905 may be performed by a bundling capability manager 1525 as described with reference to FIG. 15.

At 1910, the method may include transmitting, to the UE based on the first control message, control signaling scheduling the set of multiple physical uplink channels in accordance with the bundled transmission capability. The operations of 1910 may be performed in accordance with examples as disclosed herein. In some examples, aspects of the operations of 1910 may be performed by a scheduling manager 1530 as described with reference to FIG. 15.

At 1915, the method may include receiving, based on the control signaling, the set of multiple physical uplink channels having phase continuity and a set of multiple demodulation reference signals corresponding to the set of multiple physical uplink channels. The operations of 1915 may be performed in accordance with examples as disclosed herein. In some examples, aspects of the operations of 1915 may be performed by a physical uplink channel manager 1535 as described with reference to FIG. 15.

Figure 20:
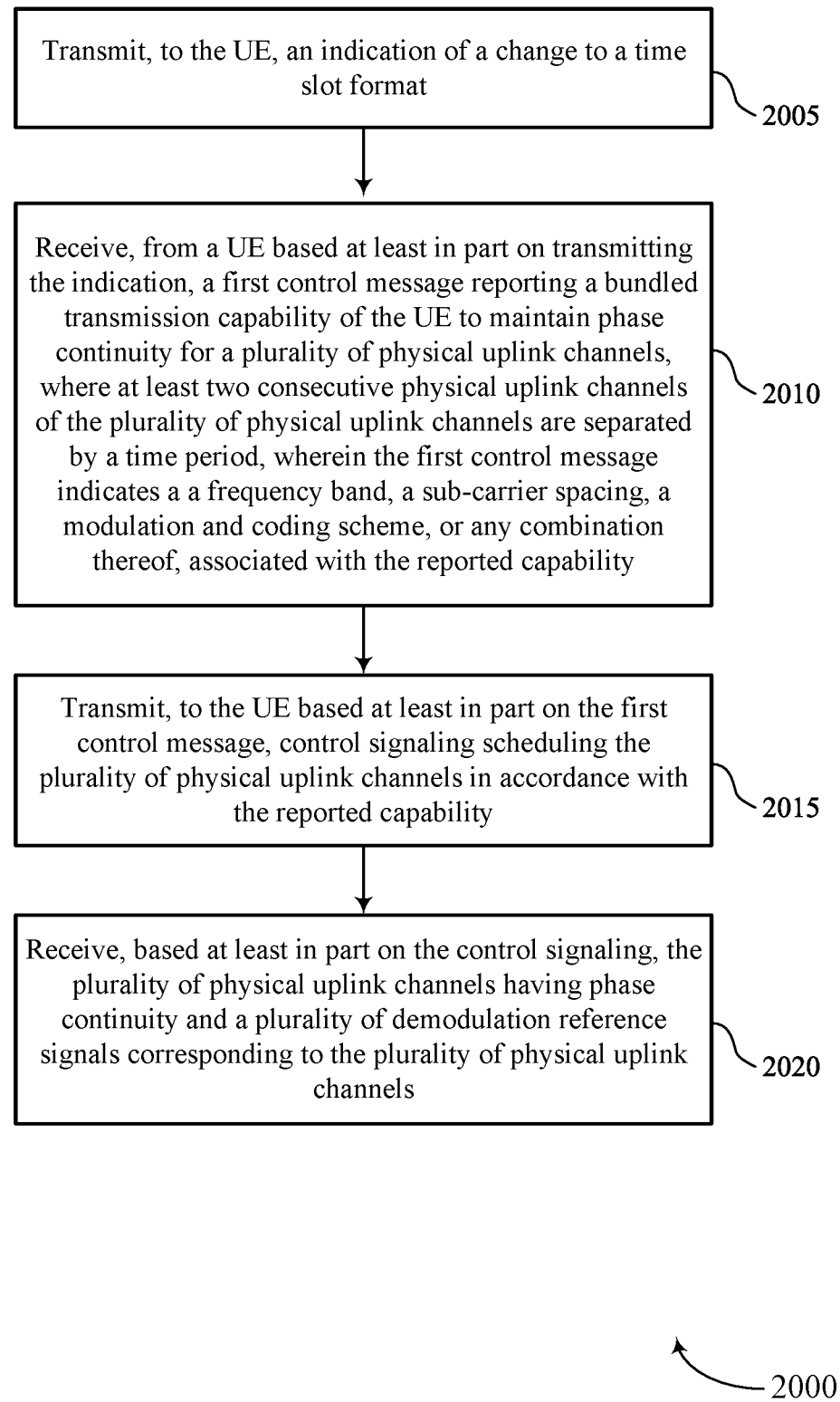

FIG. 20 shows a flowchart illustrating an exemplary method 2000 that supports capability signaling for uplink transmissions in accordance with aspects of the present disclosure. The operations of the method 2000 may be implemented by a network entity or its components as described herein. For example, the operations of the method 2000 may be performed by a network entity 105 as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2005, the method may include transmitting, to a UE, an indication of a change to a time slot format. The operations of 2005 may be performed in accordance with examples as disclosed herein. In some examples, aspects of the operations of 2005 may be performed by a time slot format manager 1540 as described with reference to FIG. 15.

At 2010, the method may include receiving, from a UE based at least in part on transmitting the indication, a first control message reporting a bundled transmission capability of the UE to maintain phase continuity for a set of multiple physical uplink channels, wherein the first control message indicates a frequency band, a modulation and coding scheme, or both, associated with the bundled transmission capability. The operations of 2010 may be performed in accordance with examples as disclosed herein. In some examples, aspects of the operations of 2010 may be performed by a bundling capability manager 1525 as described with reference to FIG. 15.

At 2015, the method may include transmitting, to the UE based on the first control message, control signaling scheduling the set of multiple physical uplink channels in accordance with the bundled transmission capability. The operations of 2015 may be performed in accordance with examples as disclosed herein. In some examples, aspects of the operations of 2015 may be performed by a scheduling manager 1520 as described with reference to FIG. 15.

At 2020, the method may include receiving, based on the control signaling, the set of multiple physical uplink channels having phase continuity and a set of multiple demodulation reference signals corresponding to the set of multiple physical uplink channels. The operations of 2020 may be performed in accordance with examples as disclosed herein. In some examples, aspects of the operations of 2020 may be performed by a physical uplink channel manager 1535 as described with reference to FIG. 15.

The following provides an overview of aspects of the present disclosure:

Aspect 1: A method for wireless communications at a UE, comprising: transmitting, to a network entity, a first control message reporting a bundled transmission capability of the UE to maintain phase continuity for a plurality of physical uplink channels; receiving, from the network entity, control signaling scheduling the plurality of physical uplink channels in accordance with the bundled transmission capability; and transmitting, based at least in part on the control signaling, the plurality of physical uplink channels having phase continuity and a plurality of demodulation reference signals corresponding to the plurality of physical uplink channels.

Aspect 2: The method of aspect 1, wherein at least two consecutive physical uplink channels of the plurality of physical uplink channels are separated by a time period.

Aspect 3: The method of aspect 2, wherein the time period is a time duration of less than a slot.

Aspect 4: The method of any of aspects 1 through 3, wherein the time period is a time duration greater than or equal to a slot.

Aspect 5: The method of any of aspects 1 through 4, wherein transmitting the first control message comprises: transmitting the first control message indicating that the UE is capable of maintaining phase continuity for the plurality of physical uplink channels that are scheduled over a plurality of time slots.

Aspect 6: The method of aspect 5, wherein at least a portion of the plurality of time slots are consecutive in time within the plurality of time slots.

Aspect 7: The method of any of aspects 1 through 6, wherein transmitting the first control message comprises: transmitting the first control message indicating a frequency band, a modulation and coding scheme, or both, associated with the bundled transmission capability.

Aspect 8: The method of any of aspects 1 through 7, wherein transmitting the first control message comprises: transmitting the first control message indicating whether the UE is capable of maintaining phase continuity for the plurality of physical uplink channels when at least one of the plurality of physical uplink channels comprises one or more intervening non-bundled transmissions.

Aspect 9: The method of any of aspects 1 through 8, wherein transmitting the first control message comprises: receiving, from the network entity, a second control message indicating a change to a time slot format, wherein transmitting the first control message is based at least in part on receiving the second control message.

Aspect 10: The method of any of aspects 1 through 9, wherein transmitting the first control message comprises: transmitting the first control message indicating that the UE is capable of maintaining phase continuity for the plurality of physical uplink channels when scheduled within a same time slot.

Aspect 11: The method of any of aspects 1 through 10, wherein transmitting the first control message comprises: transmitting the first control message indicating that the UE is capable of maintaining phase continuity for the plurality of physical uplink channels that are scheduled over a plurality of time slots.

Aspect 12: The method of aspect 11, wherein the plurality of time slots are consecutive in time or include at least one intervening time slot.

Aspect 13: The method of any of aspects 1 through 12, wherein transmitting the first control message comprises: transmitting the first control message indicating a frequency band, a sub-carrier spacing, a modulation and coding scheme, or any combination thereof, associated with the reported capability.

Aspect 14: The method of any of aspects 1 through 13, wherein transmitting the first control message comprises: transmitting the first control message indicating a threshold number of time slots for the time period between the at least two consecutive physical uplink channels over which the UE is capable of maintaining phase continuity.

Aspect 15: The method of any of aspects 1 through 14, wherein transmitting the first control message comprises: transmitting the first control message requesting that the network entity refrain from scheduling uplink transmission, or downlink transmission, or both, for the UE during the time period.

Aspect 16: The method of any of aspects 1 through 15, wherein transmitting the first control message comprises: transmitting the first control message indicating that the UE supports scheduling of one or more downlink transmissions, one or more reference signal measurement durations, or any combination thereof, during the time period.

Aspect 17: The method of any of aspects 1 through 16, wherein transmitting the first control message comprises: transmitting the first control message indicating that the UE supports scheduling of one or more uplink transmissions during the time period.

Aspect 18: The method of aspect 17, wherein receiving the control signaling comprises: receiving the control signaling configuring a same set of parameter values for transmission of each of the plurality of physical uplink channels and the one or more uplink transmissions.

Aspect 19: The method of aspect 18, wherein the same set of parameters comprises: bandwidth, transmit power, modulation order, number of layers, antenna port, transmitted precoding matrix indicator, carrier, transmit chain switching configuration, or any combination thereof.

Aspect 20: The method of any of aspects 1 through 19, wherein transmitting the first control message comprises: transmitting the first control message indicating that the UE supports scheduling of one or more intervening uplink transmissions during a first portion of a time period, a second portion of the time period that includes a transmission gap after an intervening scheduled transmission, or any combination thereof.

Aspect 21: The method of any of aspects 1 through 20, wherein transmitting the first control message comprises:

transmitting the first control message indicating a maximum duration for the time period between at least two consecutive physical uplink channels over which the UE is capable of maintaining phase continuity.

Aspect 22: The method of any of aspects 1 through 21, wherein transmitting the first control message comprises: transmitting the first control message indicating that the UE supports transmission of the plurality of physical uplink channels that are all scheduled within a same frame.

Aspect 23: The method of any of aspects 1 through 22, wherein transmitting the first control message comprises: transmitting the first control message indicating that the UE is capable of maintaining phase continuity for a plurality of physical uplink channels scheduled across a plurality of carriers in carrier aggregation.

Aspect 24: The method of aspect 23, wherein transmitting the first control message comprises: transmitting the first control message indicating that the UE is capable of maintaining phase continuity for a plurality of physical uplink channels scheduled across a first carrier of the plurality of carriers during a first transmission window that is aligned in time with a second transmission window of a second carrier of the plurality of carriers.

Aspect 25: The method of any of aspects 1 through 24, wherein transmitting the first control message comprises: transmitting the first control message indicating that the UE is capable of maintaining phase continuity for a plurality of physical uplink channels scheduled across a plurality of transmit chains.

Aspect 26: The method of any of aspects 1 through 25, wherein the plurality of physical uplink channels comprises: a plurality of physical uplink shared channels, a plurality of physical uplink control channels, or both.

Aspect 27: The method of any of aspects 1 through 26, wherein the plurality of physical uplink channels comprises: a plurality of repetitions of a same physical uplink channel, or two or more different physical uplink channels scheduled by a plurality of downlink control information messages, or any combination thereof.

Aspect 28: A method for wireless communications at a network entity, comprising: receiving, from a UE, a first control message reporting a bundled transmission capability of the UE to maintain phase continuity for a plurality of physical uplink channels; transmitting, to the UE based at least in part on the first control message, control signaling scheduling the plurality of physical uplink channels in accordance with the bundled transmission capability; and receiving, based at least in part on the control signaling, the plurality of physical uplink channels having phase continuity and a plurality of demodulation reference signals corresponding to the plurality of physical uplink channels.

Aspect 29: The method of aspect 28, wherein at least two consecutive physical uplink channels of the plurality of physical uplink channels are separated by a time period.

Aspect 30: The method of aspect 29, wherein the time period is a time duration of less than a slot.

Aspect 31: The method of any of aspects 29 through 30, wherein the time period is a time duration greater than or equal to a slot.

Aspect 32: The method of aspect 28, further comprising: transmitting, to the UE, a second control message indicating a change to a time slot format, wherein receiving the first control message is based at least in part on transmitting the second control message.

Aspect 33: The method of any of aspects 28 through 32, wherein receiving the first control message comprises: receiving the first control message indicating that the UE is capable of maintaining phase continuity for the plurality of physical uplink channels when scheduled within a same time slot.

Aspect 34: The method of any of aspects 28 through 33, wherein receiving the first control message comprises: receiving the first control message indicating that the UE is capable of maintaining phase continuity for the plurality of physical uplink channels that are scheduled over a plurality of time slots.

Aspect 35: The method of aspect 34, wherein at least a portion of the plurality of time slots are consecutive in time within the plurality of time slots.

Aspect 36: The method of any of aspects 28 through 35, wherein receiving the first control message comprises: receiving the first control message indicating a frequency band, a sub-carrier spacing, a modulation and coding scheme, or any combination thereof, associated with the bundled transmission capability.

Aspect 37: The method of any of aspects 28 through 36, wherein receiving the first control message comprises: receiving the first control message indicating a threshold number of time slots for the time period between the at least two consecutive physical uplink channels over which the UE is capable of maintaining phase continuity.

Aspect 38: The method of any of aspects 28 through 37, wherein receiving the first control message comprises: receiving the first control message requesting that the network entity refrain from scheduling uplink transmission, or downlink transmission, or both, for the UE during the time period.

Aspect 39: The method of any of aspects 28 through 38, wherein receiving the first control message comprises: receiving the first control message indicating that the UE supports scheduling of one or more downlink transmissions, one or more reference signal measurement durations, or any combination thereof, during the time period between the at least two consecutive physical uplink channels.

Aspect 40: The method of any of aspects 28 through 39, wherein receiving the first control message comprises: receiving the first control message indicating that the UE supports scheduling of one or more uplink transmissions during the time period.

Aspect 41: The method of aspect 40, wherein transmitting the control signaling comprises: transmitting the control signaling configuring a same set of parameter values for transmission of each of the plurality of physical uplink channels and the one or more uplink transmissions.

Aspect 42: The method of aspect 41, the same set of parameters comprises: bandwidth, transmit power, modulation order, number of layers, antenna port, TPMI, carrier, transmit chain switching configuration, or any combination thereof.

Aspect 43: The method of any of aspects 28 through 42, wherein receiving the first control message comprises: receiving the first control message indicating that the UE supports scheduling of one or more intervening uplink transmissions during a first portion of the time period, a second portion of the time period that includes a transmission gap after an intervening scheduled transmission, or any combination thereof.

Aspect 44: The method of any of aspects 28 through 43, wherein receiving the first control message comprises: receiving the first control message indicating a maximum duration for the time period between at least two consecutive physical uplink channels over which the UE is capable of maintaining phase continuity.

Aspect 45: The method of any of aspects 28 through 44, wherein receiving the first control message comprises: receiving the first control message indicating that the UE supports transmission of the plurality of physical uplink channels that are all scheduled within a same frame.

Aspect 46: The method of any of aspects 28 through 45, wherein receiving the first control message comprises: receiving the first control message indicating that the UE is capable of maintaining phase continuity for a plurality of physical uplink channels scheduled across a plurality of carriers in a carrier aggregation scenario.

Aspect 47: The method of aspect 46, wherein receiving the first control message comprises: receiving the first control message indicating that the UE is capable of maintaining phase continuity for a plurality of physical uplink channels scheduled across a first carrier of the plurality of carriers during a first transmission window that is aligned in time with a second transmission window of a second carrier of the plurality of carriers.

Aspect 48: The method of any of aspects 28 through 47, wherein receiving the first control message comprises: receiving the first control message indicating that the UE is capable of maintaining phase continuity for a plurality of physical uplink channels scheduled across a plurality of transmit chains.

Aspect 49: The method of any of aspects 28 through 48, wherein the plurality of physical uplink channels comprises: a plurality of physical uplink shared channels, a plurality of physical uplink control channels, or both.

Aspect 50: The method of any of aspects 28 through 49, wherein the plurality of physical uplink channels comprises: a plurality of repetitions of a same physical uplink channel, or two or more different physical uplink channels scheduled by a plurality of downlink control information messages, or any combination thereof.

Aspect 51: An apparatus for wireless communications at a UE, comprising a processor; memory coupled with the processor; and instructions stored in the memory and executable by the processor to cause the apparatus to perform a method of any of aspects 1 through 27.

Aspect 52: An apparatus for wireless communications at a UE, comprising at least one means for performing a method of any of aspects 1 through 27.

Aspect 53: A non-transitory computer-readable medium storing code for wireless communications at a UE, the code comprising instructions executable by a processor to perform a method of any of aspects 1 through 27.

Aspect 54: A computer program comprising code for wireless communications that, when executed by a processor of a UE, causes the processor to perform the method of any of aspects 1 through 27.

Aspect 55: An apparatus for wireless communications at a network entity, comprising a processor; memory coupled with the processor; and instructions stored in the memory and executable by the processor to cause the apparatus to perform a method of any of aspects 28 through 50.

Aspect 56: An apparatus for wireless communications at a network entity, comprising at least one means for performing a method of any of aspects 28 through 50.

Aspect 57: A non-transitory computer-readable medium storing code for wireless communications at a network entity, the code comprising instructions executable by a processor to perform a method of any of aspects 28 through 50.

Aspect 58: A computer program comprising code for wireless communications that, when executed by a processor of a network entity, causes the processor to perform the method of any of aspects 28 through 50.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   transmitting, to a network entity, a first control message reporting a bundled transmission capability of the UE to maintain phase continuity for a plurality of physical uplink channels, the first control message indicating a maximum duration for a time period between at least two consecutive physical uplink channel transmissions over which the UE is capable of maintaining phase continuity;
   receiving, from the network entity, control signaling scheduling the plurality of physical uplink channels in accordance with the bundled transmission capability; and
   transmitting, based at least in part on the control signaling, the plurality of physical uplink channels having phase continuity and a plurality of demodulation reference signals corresponding to the plurality of physical uplink channels.

2. The method of claim 1, wherein at least two consecutive physical uplink channels of the plurality of physical uplink channels are separated by a time period.

3. The method of claim 2, wherein the time period is a time duration of less than a slot.

4. The method of claim 2, wherein the time period is a time duration greater than or equal to a slot.

5. The method of claim 1, wherein transmitting the first control message comprises:
   transmitting the first control message indicating that the UE is capable of maintaining phase continuity for the plurality of physical uplink channels that are scheduled over a plurality of time slots.

6. The method of claim 5, wherein at least a portion of the plurality of time slots are consecutive in time within the plurality of time slots.

7. The method of claim 1, wherein transmitting the first control message comprises:
   transmitting the first control message indicating a frequency band, a modulation and coding scheme, or both, associated with the bundled transmission capability.

8. The method of claim 1, wherein transmitting the first control message comprises:
   transmitting the first control message indicating that the UE is capable of maintaining phase continuity for the plurality of physical uplink channels when at least one of the plurality of physical uplink channels comprises one or more intervening non-bundled transmissions.

9. The method of claim 1, further comprising:
   receiving, from the network entity, a second control message indicating a change to a time slot format, wherein transmitting the first control message is based at least in part on receiving the second control message.

10. The method of claim 1, wherein transmitting the first control message comprises:
    transmitting the first control message indicating that the UE is capable of maintaining phase continuity for the plurality of physical uplink channels when scheduled within a same time slot.

11. The method of claim 1, wherein transmitting the first control message comprises:

transmitting the first control message indicating a threshold number of time slots for a time period between the at least two consecutive physical uplink channel transmissions over which the UE is capable of maintaining phase continuity.

12. The method of claim 1, wherein transmitting the first control message comprises:
transmitting the first control message indicating that the UE supports scheduling of one or more intervening uplink transmissions during a first portion of a time period, a second portion of the time period that includes a transmission gap after an intervening scheduled transmission, or any combination thereof.

13. The method of claim 1, wherein transmitting the first control message comprises:
transmitting the first control message indicating that the UE is capable of maintaining phase continuity for a plurality of physical uplink channels scheduled across a plurality of carriers in carrier aggregation.

14. The method of claim 13, wherein transmitting the first control message comprises:
transmitting the first control message indicating that the UE is capable of maintaining phase continuity for a plurality of physical uplink channels scheduled across a first carrier of the plurality of carriers during a first transmission window that is aligned in time with a second transmission window of a second carrier of the plurality of carriers.

15. The method of claim 1, wherein transmitting the first control message comprises:
transmitting the first control message indicating that the UE is capable of maintaining phase continuity for a plurality of physical uplink channels scheduled across a plurality of transmit chains.

16. The method of claim 1, wherein the plurality of physical uplink channels comprises:
a plurality of physical uplink shared channels, a plurality of physical uplink control channels, or both.

17. The method of claim 1, wherein the plurality of physical uplink channels comprises:
a plurality of repetitions of a same physical uplink channel, or two or more different physical uplink channels scheduled by a plurality of downlink control information messages, or any combination thereof.

18. A method for wireless communications at a network entity, comprising:
receiving, from a user equipment (UE), a first control message reporting a bundled transmission capability of the UE to maintain phase continuity for a plurality of physical uplink channels, the first control message indicating a maximum duration for a time period between at least two consecutive physical uplink channel transmissions over which the UE is capable of maintaining phase continuity;
transmitting, to the UE based at least in part on the first control message, control signaling scheduling the plurality of physical uplink channels in accordance with the bundled transmission capability; and
receiving, based at least in part on the control signaling, the plurality of physical uplink channels having phase continuity,
and a plurality of demodulation reference signals corresponding to the plurality of physical uplink channels.

19. The method of claim 18, wherein at least two consecutive physical uplink channels of the plurality of physical uplink channels are separated by a time period.

20. The method of claim 19, wherein the time period is a time duration of less than a slot.

21. The method of claim 19, wherein the time period is a time duration greater than or equal to a slot.

22. The method of claim 18, wherein receiving the first control message comprises:
receiving the first control message indicating that the UE is capable of maintaining phase continuity for the plurality of physical uplink channels that are scheduled over a plurality of time slots.

23. The method of claim 22, wherein at least a portion of the plurality of time slots are consecutive in time within the plurality of time slots.

24. The method of claim 18, wherein receiving the first control message comprises:
receiving the first control message indicating a frequency band, a modulation and coding scheme, or both, associated with the bundled transmission capability.

25. The method of claim 18, wherein receiving the first control message comprises:
receiving the first control message indicating that the UE is capable of maintaining phase continuity for the plurality of physical uplink channels when at least one of the plurality of physical uplink channels comprises one or more intervening non-bundled transmissions.

26. The method of claim 18, wherein receiving the first control message comprises:
receiving the first control message indicating that the UE is capable of maintaining phase continuity for a plurality of physical uplink channels scheduled across a plurality of carriers in carrier aggregation.

27. The method of claim 26, wherein receiving the first control message comprises:
receiving the first control message indicating that the UE is capable of maintaining phase continuity for a plurality of physical uplink channels scheduled across a first carrier of the plurality of carriers during a first transmission window that is aligned in time with a second transmission window of a second carrier of the plurality of carriers.

28. An apparatus for wireless communications at a user equipment (UE), comprising:
a transceiver;
one or more processors;
memory coupled with the one or more processors; and
instructions stored in the memory and executable by the one or more processors to cause the apparatus to:
transmit, to a network entity via the transceiver, a first control message reporting a bundled transmission capability of the UE to maintain phase continuity for a plurality of physical uplink channels, the first control message indicating a maximum duration for a time period between at least two consecutive physical uplink channel transmissions over which the UE is capable of maintaining phase continuity;
receive, from the network entity via the transceiver, control signaling scheduling the plurality of physical uplink channels in accordance with the bundled transmission capability; and
transmit, via the transceiver based at least in part on the control signaling, the plurality of physical uplink channels having phase continuity and a plurality of demodulation reference signals corresponding to the plurality of physical uplink channels.

29. An apparatus for wireless communications at a network entity, comprising:

a transceiver;
one or more processors;
memory coupled with the one or more processors; and
instructions stored in the memory and executable by the one or more processors to cause the apparatus to:
  receive, from a user equipment (UE) via the transceiver, a first control message reporting a bundled transmission capability of the UE to maintain phase continuity for a plurality of physical uplink channels, the first control message indicating a maximum duration for a time period between at least two consecutive physical uplink channel transmissions over which the UE is capable of maintaining phase continuity;
  transmit, to the UE via the transceiver based at least in part on the first control message, control signaling scheduling the plurality of physical uplink channels in accordance with the bundled transmission capability; and
  receive, via the transceiver based at least in part on the control signaling, the plurality of physical uplink channels having phase continuity and a plurality of demodulation reference signals corresponding to the plurality of physical uplink channels.

30. The method of claim 1, wherein maintaining phase continuity includes using a same transmit power for the at least two consecutive physical uplink channel transmissions.

* * * * *